United States Patent
Yamada et al.

(10) Patent No.: US 6,333,788 B1
(45) Date of Patent: *Dec. 25, 2001

(54) IMAGE PROCESSING APPARATUS AND METHOD

(75) Inventors: Osamu Yamada, Yokohama; Takeshi Makita, Kawasaki; Kazuhiro Saito; Hiroshi Mori, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,606

(22) Filed: Feb. 27, 1997

(30) Foreign Application Priority Data

Feb. 28, 1996 (JP) .................................... 8-041637
Feb. 28, 1996 (JP) .................................... 8-041638

(51) Int. Cl.$^7$ .................................... G06F 15/00
(52) U.S. Cl. .................................... 358/1.15; 358/1.9
(58) Field of Search .................................... 382/270, 271, 382/272, 273, 274, 300, 428, 451, 172; 358/521, 458, 461, 532, 520, 522, 525, 428, 456

(56) References Cited

U.S. PATENT DOCUMENTS 5,060,053 * 10/1991 Muramoto ............................. 358/21
5,754,710 * 5/1998 Sekine et al. ........................ 382/300
5,764,611 * 6/1998 Watanabe ............................. 369/59

OTHER PUBLICATIONS

Otsu, "An Automatic Threshold Selection Method Based on Discriminant & Least Squares Criteria", Journal of Papers of the Institute of Electronics, Information & Communication Engineers, vol. J63–D, No. 4, pp. 349–356, (1980).

* cited by examiner

Primary Examiner—Joseph Mancuso
Assistant Examiner—Douglas Tran
(74) Attorney, Agent, or Firm—Fitzpatrick, Cella, Harper & Scinto

(57) ABSTRACT

The luminance frequencies are calculated in units of blocks in a multi-valued image, and the binarization threshold values in units of blocks are calculated on the basis of the calculated luminance frequencies. By interpolating the binarization threshold values in units of blocks, the binarization threshold values in units of pixels are calculated, and the multi-valued image is binarized using the binarization threshold values in units of pixels.

13 Claims, 19 Drawing Sheets

FIG. 9

|              | START | END | AV  | SK    |
|--------------|-------|-----|-----|-------|
| FIRST LOOP   | 0     | 255 | 109 | −27.4 |
| SECOND LOOP  | 0     | 109 | 62  | 8.9   |
| THIRD LOOP   | 62    | 109 | 84  | 1.9   |
| FOURTH LOOP  | 84    | 109 | 96  | 0.6   |
| FIFTH LOOP   | 96    | 109 | 102 | −0.3  |
| SIXTH LOOP   | 96    | 102 | 98  | 0.3   |
| SEVENTH LOOP | 98    | 102 | 99  | 0.4   |
| EIGHTH LOOP  | 99    | 102 | 100 | 0.2   |
| NINTH LOOP   | 100   | 102 | 101 | −0.2  |
| 10TH LOOP    | 100   | 101 | 100 | 0.2   |

FIG. 11

|             | START | END | AV  | SK    |
|-------------|-------|-----|-----|-------|
| FIRST LOOP  | 0     | 255 | 130 | −60.2 |
| SECOND LOOP | 0     | 130 | 95  | −19.3 |

| 32 | 33 | 34 | 35 | ----- | 94 | 95 |
|----|----|----|----|-------|-----|-----|
| 33 | 34 | 35 | 36 | ----- | 95 | 96 |
| 34 | 35 | 36 | 37 | ----- | 96 | 97 |
| 35 | 36 | 37 | 38 | ----- | 97 | 98 |
| \| | \| | \| | \| | ----- | \| | \| |
| 94 | 95 | 96 | 97 | ----- | 157 | 158 |
| 95 | 96 | 97 | 98 | ----- | 158 | 159 |

TH_BL = 96            TH_BR = 160

IMAGE PROCESSING APPARATUS AND METHOD

BACKGROUND OF THE INVENTION

The present invention relates to an image processing apparatus and method, and its computer program product and, more particularly, to an image processing apparatus and method for binarizing a multi-valued image by determining a binarization threshold value used for binarizing a multi-valued image, and its computer program product.

In recent years, the image processing technique has advanced remarkably, and image processing apparatuses which can perform processing of multi-valued images such as full-color images including both pictures and characters, character recognition processing in multi-valued images, highly sophisticated numeric operation processing such as image processing, and the like have become popular.

In such image processing technique, binarization processing of multi-valued images including both pictures and characters is indispensable.

In one conventional binarization method, maximum and minimum values are calculated for each line or several lines of an original, and a binarization threshold value is determined on the basis of these maximum and minimum values to perform simple binarization. Also, in another method, a binarization threshold value is determined on the basis of the difference between the maximum and minimum values in units of blocks of an original to perform simple binarization. Furthermore, the Otsu's method is known. In this method, a threshold value corresponding to a maximum inter-class variance obtained when the histogram of an original is divided into two classes based on a certain threshold value is determined as a binarization threshold value (Otsu, "Automatic Threshold Value Selection Method Based on Discrimination and Least Square Criteria", *Journal of Papers of The Institute of Electronics, Information and Communication Engineers*, vol. J63-D, No. 4, pp. 349–356, 1980).

In the above-mentioned image processing technique, high-speed, high-precision numeric operation processing is indispensable upon determining the binarization threshold value in binarization processing of multi-valued images.

Conventionally, the numeric operation method on computers includes an integer operation and a floating-point operation. The integer operation is executed at high speed within the integer effective number range (from 32767 to −32768 for 16-bit integers) that can be processed by a computer, and is executed at higher speed within the internal integer effective number range (this depends on the processing environment such as a CPU, system, and the like) of the computer. On the other hand, since the floating-point operation is executed using numbers having a mantissa and an exponent, it can express various numbers from large numbers to decimal fractions.

However, the above-mentioned binarization methods in the conventional image processing apparatus suffer the following problems.

Upon binarizing an original which includes both picture and character portions in an image, in the method of performing binarization in units of lines of an original, since both the picture and character portions are present on an identical line, it is difficult to set a threshold value suitable for both the picture and character portions. As a consequence, if the threshold value is preferentially determined for the picture portion, the character portion is battered. On the other hand, when the threshold value is preferentially determined for the character portion, the picture portion is battered or blurred. In the method of performing binarization in units of blocks of an original, since it cannot be determined if data in each block corresponds to a picture region or a character region, it is difficult to set a threshold value suitable for both the picture and character portions, and the binarization result is battered or blurred. Since binarization processing is performed in units of blocks, block distortion is generated in the binarization result. Also, when a background portion is present in one block and a character portion is present in a block thereabove, even the background portion is reproduced to have density by binarization, and a binary image which has many noise components in the character portion is generated.

Furthermore, in the Otsu's method, when the picture and character portions have different features in the distributions of the two classes, and the distributions of the two classes are extremely different from each other, the threshold value tends to be offset to the larger class of the two and, hence, a binary image including many noise components is generated.

Even in determining a binarization threshold value in the binarization processing of multi-valued image, it is required to determine the binarization threshold value by a statistical calculation of the image histogram using the integer and floating-point operations.

The calculation method in determining the binarization threshold value has the following problems.

When a numeric operation for image processing is performed by the integer operation, the arithmetic operation speed is greatly higher than that in the floating-point operation. However, errors are generated since the decimal part is rounded off in, e.g., a division, and such errors are apt to accumulate when repetitive arithmetic operations include a division. As a consequence, high precision cannot be maintained. Also, the integer range is limited; the integer operation cannot process a large number beyond the range and a decimal fraction.

When a numeric operation for image processing is attained by the floating-point operation, high precision can be maintained, but the arithmetic operation speed is low, resulting in a long processing time.

SUMMARY OF THE INVENTION

The present invention has been made to solve the above-mentioned problems, and has as its object to provide an image processing apparatus and method which can automatically set appropriate binarization threshold values for appropriately separating the object from the background respectively for a character portion and a portion other than the character portion in an image, and can obtain a binary image free from any block distortion, and its computer program product.

It is another object of the present invention to provide an image processing apparatus and method, which can shorten the interpolation processing time for smoothing by allowing adjustment of the parameters for regions or the like to be interpolated, and can realize interpolation processing corresponding to a specific resolution of an input apparatus or an input image.

The present invention has been made to solve the above-mentioned problems, and has as its object to provide a numeric operation apparatus and method for image processing, which can maintain predetermined precision within the limited integer effective number range that can be processed by a computer, and can attain high-speed repetitive arithmetic operations while allowing convergence of large numbers as well as small numbers, and its computer program product.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a table showing an example of changes in variables in the battered character binarization processing in the embodiment shown in FIG. 1;

FIG. 11 is a table showing an example of changes in variables in the blurred character binarization processing in the embodiment shown in FIG. 1;

FIG. 16 is a view showing the interpolation operation results in smoothing blocks when TH_TL=32, TH_TR=96, TH_BL=96, and TH_BR=160;

DETAILED DESCRIPTION OF THE PREFERRED EMBODIMENTS

The preferred embodiments of the present invention will be described in detail hereinafter with reference to the accompanying drawings.

Figure 1:
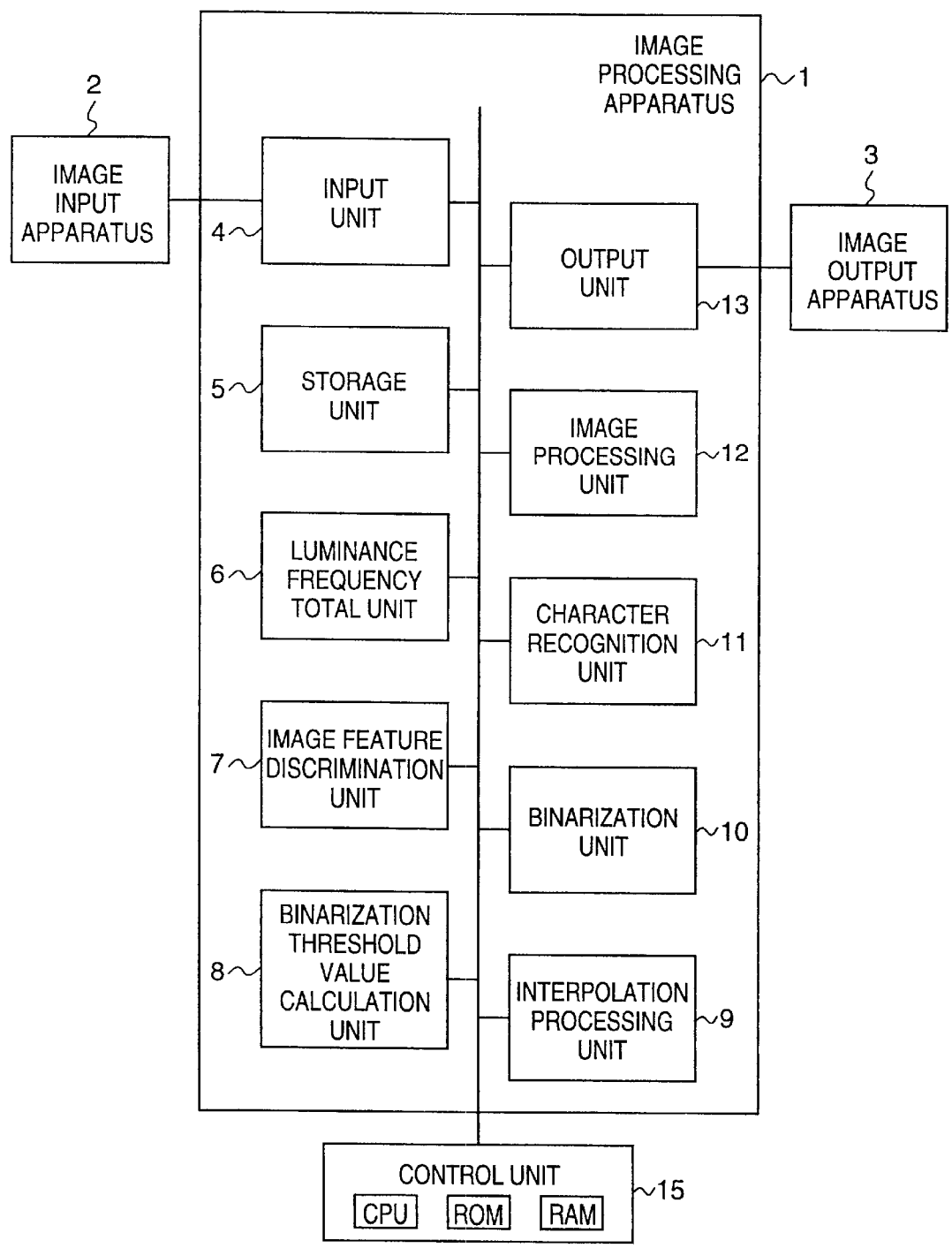
FIG. 1 is a block diagram showing the system arrangement of an image processing apparatus according to an embodiment of the present invention.

FIG. 1 is a block diagram showing the system arrangement for executing binarization processing in this embodiment. Referring to FIG. 1, reference numeral 1 denotes an image processing apparatus for performing binarization processing, character recognition processing, and the like of an image; 2, an image input apparatus such as a scanner for inputting an image; and 3, an image output apparatus for displaying or recording the processed image.

In the image processing apparatus 1, reference numeral 4 denotes an input unit serving as an interface with the image input apparatus 2; 5, a storage unit such as a memory for storing data in processing; and 6, a luminance frequency total unit for summing up the luminance frequencies (histogram) of an input image. Reference numeral 7 denotes an image feature discrimination unit for discriminating if an input image is a character image; 8, a binarization threshold value calculation unit for calculating binarization threshold values in units of blocks of an input image; 9, an interpolation processing unit for calculating binarization threshold values in units of pixels by performing interpolation processing on the basis of the binarization threshold values in units of blocks; and 10, a binarization unit for producing a binary image using the binarization threshold values in units of pixels calculated by the interpolation processing unit 9. Reference numeral 11 denotes a character recognition unit for performing character recognition processing for a region extracted as a character region; 12, an image processing unit for performing various kinds of image processing for a region separated as a region other than the character region, and image layout processing; and 13, an output unit serving as an interface with the image output apparatus 3. These units are systematically controlled by a control unit 15 comprising a CPU, ROM, and RAM.

The character recognition processing executed in the image processing apparatus 1 of this embodiment with the above-mentioned arrangement will be explained below.

Figure 2:
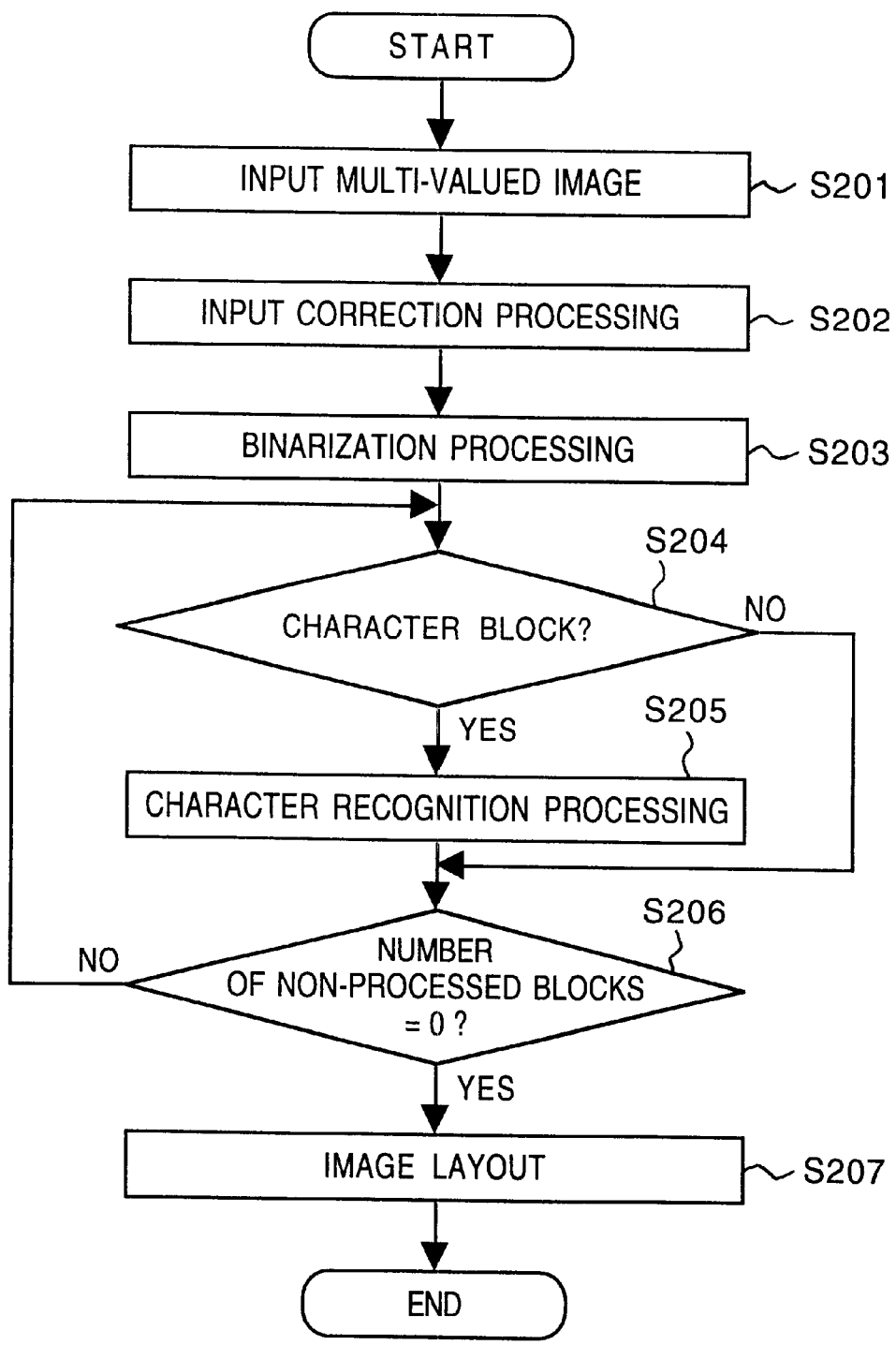
FIG. 2 is a flow chart showing the character recognition processing in the embodiment shown in FIG. 1.

FIG. 2 is a flow chart showing the character recognition processing using a binarization threshold value determination method as a characteristic feature of this embodiment.

In step S201, image data is input by the image input apparatus 2 such as a scanner. In this case, image data is input as 8-bit multi-valued image data. In step S202, the input image is subjected to correction such as removal of electrical noise of the image input apparatus 2 generated upon inputting image data, and correction for deterioration of an original image, a skew of the original, and the like. Subsequently, in step S203, a character block (a battered character block or blurred character block) is discriminated as a characteristic feature of this embodiment with respect to the multi-valued image input in step S201, optimal binarization threshold values are set for the discriminated character blocks, and a binary image is produced based on the determined binarization threshold values. The flow then advances to step S204 to check if the binary image binarized in step S203 corresponds to a block determined as a character block. In step S205, the character block is extracted from the binary image, and is subjected to character recognition processing. Then, recognized character codes are output. In step S206, it is checked if non-processed blocks remain in the image. If a non-processed block remains, the flow returns to step S204; otherwise, the flow advances to step S207. In step S207, character blocks and non-character blocks are synthesized in the same layout as that of the original image.

<Binarization Processing>

Step S203 for discriminating a character block (a battered character block or blurred character block) as the characteristic feature of this embodiment and performing the binarization processing will be described in detail below with reference to the flow chart in FIG. 3.

Figure 3:
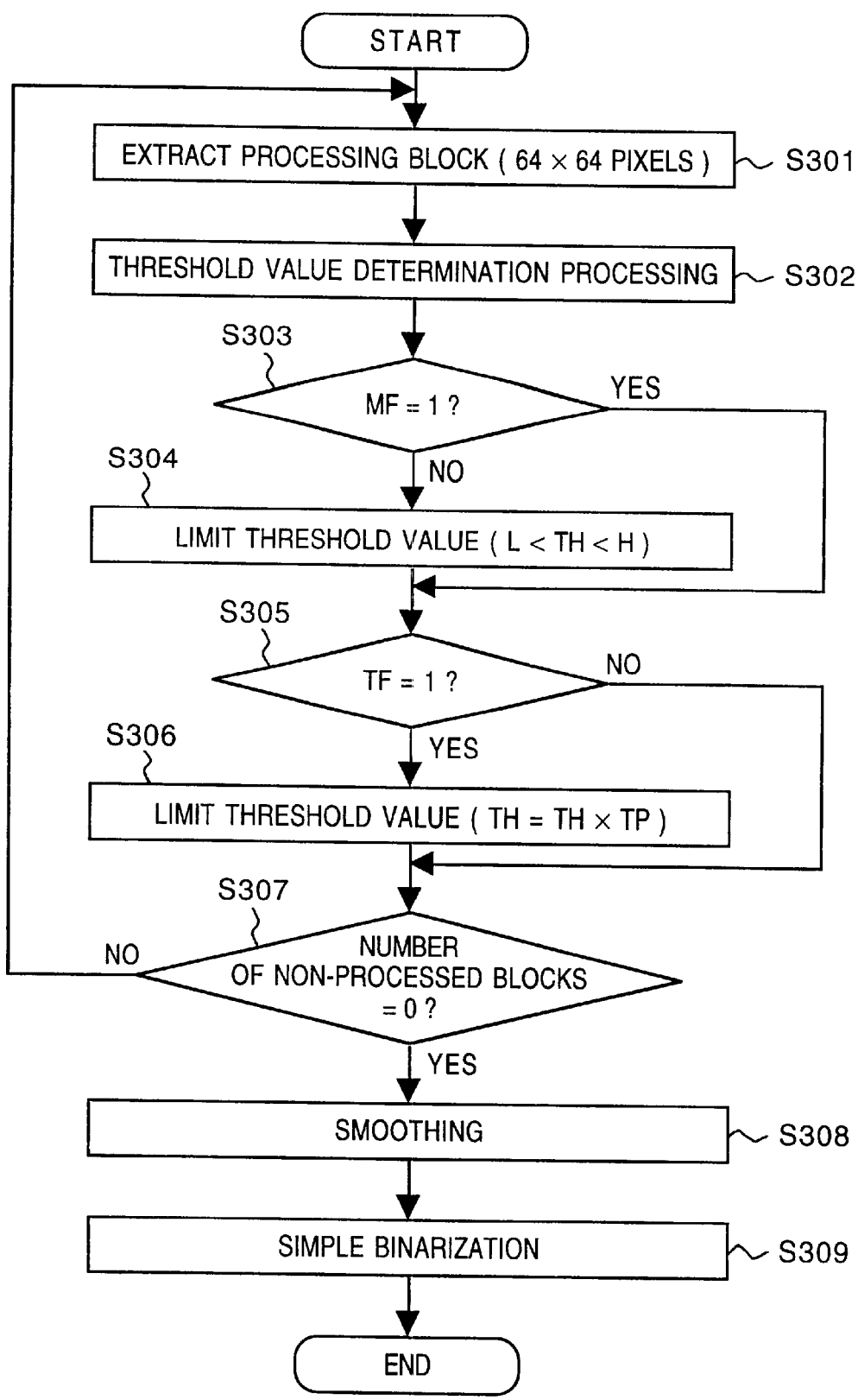
FIG. 3 is a flow chart showing the binarization processing in the embodiment shown in FIG. 1.

Referring to FIG. 3, in step S301, an 8-bit multi-valued image is input from the storage unit 5 in the image processing apparatus 1 to a memory or the like (not shown) in units of processing blocks (64 pixels×64 pixels). Note that the multi-valued image is stored in advance in the storage unit 5 by the image input apparatus 2 such as a scanner. In step S302, a character block (a battered character block or blurred character block) is discriminated, and threshold value determination processing for binarization is performed in units of processing blocks (64 pixels×64 pixels) of the input image. A battered character is a character which is battered due to a large number of strokes of one character, and a blurred character is a character having a low density. In this embodiment, optimal threshold values can be assigned to these characters. It is checked in step S303 if a character flag MF is "1" (to check if the block being processed is a character block; to be described in detail later). If Y (YES) in step S303, the flow jumps to step S305; otherwise, the flow advances to step S304. In step S304, a threshold value TH is limited by upper- and lower-limit values L and H. More specifically, limitation processing is performed, i.e., when the threshold value TH determined in step S302 is smaller than the lower-limit value L, the threshold value TH is represented by L; when the threshold value TH is larger than the upper-limit value H, the threshold value TH is represented by H. Note that these upper- and lower-limit values H and L are determined by the characteristics of the image input apparatus 2.

It is checked in step S305 if a battered character flag TF is "1" (to check if the block being processed is a battered character block; to be described in detail later). If Y in step S305, the flow advances to step S306; otherwise, the flow jumps to step S307. In step S307, the threshold value TH is limited. More specifically, limitation processing for multiplying the threshold value TH determined in step S302 or S304 by a constant TP for preventing a battered character is performed. Note that the constant TP is a value determined by the characteristics of the image input apparatus 2. In step S307, it is checked if the current block is the last processing block (64 pixels×64 pixels) of the input image. If the current block is the last processing block, the flow advances to step S308; if a non-processed block remains, the flow returns to step S301. In step S308, smoothing processing (to be described in detail later) is performed on the basis of threshold values TH in units of blocks determined in step S302, S304, or S306 to calculate threshold values TH in units of pixels. Finally, simple binarization processing is performed in step S309 using the threshold values TH in units of pixels calculated in step S308, thus ending this binarization processing.

<Threshold Value Determination Processing>

The binarization threshold value determination processing in this embodiment will be described in detail below with reference to the flow chart in FIG. 4.

In step S401, "0" and "255" are respectively set in parameters START and END. The parameters START and END respectively correspond to the start and end points of the statistical quantity of a luminance value calculated in step S402 or S403 later. Also, "0" is set in a threshold value determination processing loop count i. In step S401, at the same time, frequencies (histogram) for 8 bits, i.e., digital values ranging from "0" to "255" are calculated using all the pixels in one processing block (64 pixels×64 pixels).

In step S402, an average value AV of pixels corresponding to the digital values ranging from START to END is calculated. For example, if START=0 and END=255, the average value AV of pixels having values from "0" to "255" is calculated; if START=0 and END=109, the average value AV of pixels having values from "0" to "109" is calculated.

In step S403, a skew value SK of pixels corresponding to the luminance values ranging from START to END is calculated. Note that the skew value is a statistical quantity representing the skew of the histogram distribution. The skew value is calculated using the following equation (1):

$$SK = (\Sigma(X_i - AV)^3)/D \quad (1)$$

where Xi is the luminance value of each pixel. D is the variance of the entire image and is calculated by:

$$D = \Sigma(X_i - AV)^2 \quad (2)$$

In equation (1) above, the skew value is calculated by cubing the difference between the luminance value of each pixel and the average value, but the present invention is not limited to cubing as long as the exponent is an odd value.

In step S404, the threshold value determination processing loop count i in one block is checked (to check if i=0, i.e., the current loop corresponds to the first loop). If i="0", the flow advances to step S405; otherwise, the flow advances to step S406. In step S405, image feature discrimination (to be described in detail later) for checking if the block being processed is a "character block" is performed, and thereafter, the flow advances to step S414.

In step S406, the magnitude of the skew of the histogram is checked using the following relations (3):

$$-0.1 < SK \text{ and } SK < 0.1 \quad (3)$$

More specifically, it is checked if the absolute value of the skew value SK is less than "0.1". If Y in step S406, the flow jumps to step S416; otherwise, the flow advances to step S407.

In step S407, the threshold value determination processing loop count i is checked. If i="1", the flow advances to step S408; otherwise, the flow advances to step S409. In step S408, discrimination (for checking if the block being processed is a "battered character block") and processing are performed (to be described in detail later), and the flow then advances to step S409. In step S409, the threshold value determination processing loop count i is checked. If i="9", the flow jumps to step S416; otherwise, the flow advances to step S410. In step S410, discrimination (for checking if the block being processed is a "blurred character block") and processing are performed (to be described in detail later), and the flow then advances to step S411. It is checked in step S411 if a blurred character flag KF is "1". If Y in step S411, the flow advances to step S416; otherwise, the flow advances to step S412.

In step S412, the skew direction of the histogram is determined using the following relation (4):

$$SK > 0 \quad (4)$$

If relation (4) holds in step S412 (this means that the skew of the histogram falls within the value range larger than the average value AV), the flow advances to step S413; if relation (4) does not hold (this means that the skew of the histogram falls within the value range smaller than the average value AV), the flow advances to step S414.

In step S413, the average value AV is set in START, and END is left unchanged. The flow then advances to step S415. In step S414, START is left unchanged, and the average value AV is set in END. The flow then advances to step S415. In step S415, the threshold value determination processing loop count i is incremented by "1", and the flow returns to step S402 to calculate the average value AV of values ranging from START to END again.

Finally, in step S416, the average value AV is set as the binarization threshold value TH, thus ending this threshold value determination processing.

The binarization processing of this embodiment is performed as described above. However, the present invention is not limited to the ranges defined by relations (3) and (4).

<Numeric Operation Processing>

Figure 17:
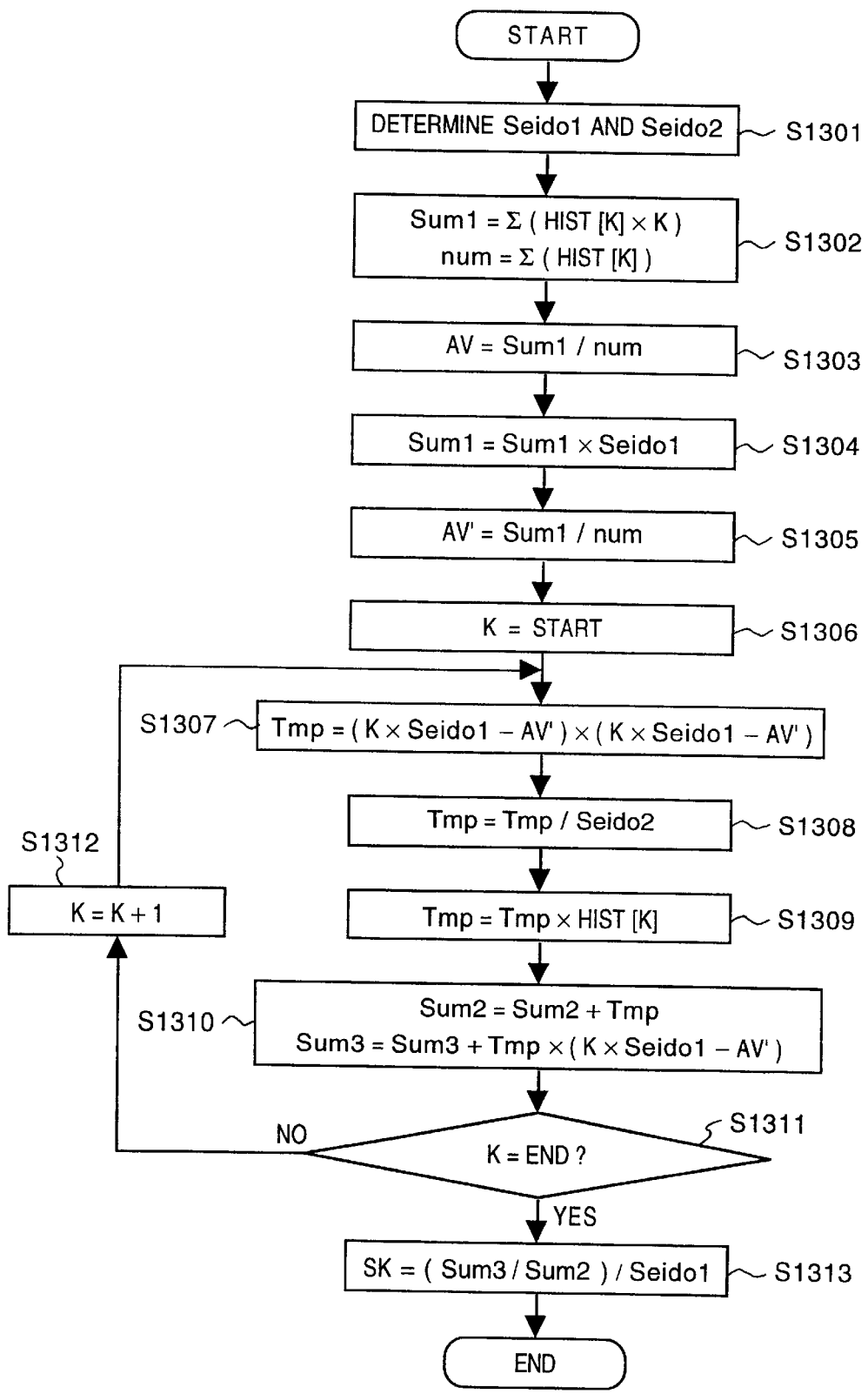
FIG. 17 is a flow chart showing the numeric operation processing.

An example that realizes two processing operations, i.e., the average value AV calculation processing (S402 in FIG. 4) and the skew value calculation processing (S403 in FIG. 4) of this embodiment as a series of processing operations on a computer will be described in detail below with reference to the flow chart in FIG. 17.

In step S1301, effective digit number saving variables Seido1 and Seido2 are determined.

Seido1 is a variable by which the operand is multiplied to shift the mantissa of the operand to the left so as to maintain the precision of the decimal part in the integer operation. In this embodiment, when the internal integer of the computer is a 16-bit value, Seido1 is set to be 256 for 8 bits; when the internal integer is a 32-bit value, Seido1 is set to be 65536 for 16 bits. Since this numeric operation processing handles 8-bit multi-valued image data, the shift width (Seido1) of the number of digits is determined to assure 8 bits or more for the original number.

Seido2 is a variable by which the operand is divided to drop some digits of the operand so as to prevent the arithmetic operation result in the integer operation from exceeding (overflowing) an integer effective number (32 bits in this embodiment) that can be processed by the computer, and is determined by the number of the threshold value determination processing loop count i, each loop having calculations of the average value AV and the skew value. As the threshold value determination processing loop count is incremented, the range between START and END narrows down, and the number of elements of the histogram decreases accordingly, thus reducing the probability of overflow occurrence. For this reason, the variable Seido2 is determined by the value i. In this embodiment, the value Seido2 is determined by the following equation to decrease the number of digits to be dropped of the operand as the number of the threshold value determination processing loop count i becomes larger:

$$Seido2 = 2^{\wedge}(10-i) \qquad (8)$$

This value is determined by the number of overflow digits corresponding to the theoretical number of bits of the maximum number of digits to be operated in units of threshold value determination processing loop counts.

If HIST[K] represents the histogram value at a luminance value K, the average value AV can be expressed by:

$$AV = (\Sigma(HIST[K] \times K))/(\Sigma(HIST[K])) \qquad (9)$$

In step S1302, a total variable Sum1=Σ(HIST[K]×K) and a cumulative variable num=Σ(HIST[K]) are calculated. In step S1303, Sum1 is divided by num to obtain the average value AV.

In step S1304, Sum1 is multiplied by Seido1 determined in step S1301. In step S1305, a precision-maintained average value AV' for skew value calculation processing is calculated.

The following steps S1306 to S1313 correspond to a modification of equations (1) and (2) of this embodiment so as to realize easy arithmetic operation processing.

In step S1306, an initial value START of the luminance value K of the processing loop of the skew value calculation processing is set.

In step S1307, an intermediate variable Tmp is calculated. The luminance value K corresponding to Tmp=(K× Seido1×AV')×(K×Seido1−AV') is multiplied by Seido1 determined in step S1301 as in the precision-maintained average value AV'.

In step S1308, Tmp is divided by Seido2 determined in step S1301. For example, when i=1 and 8-bit image data is to be processed in units of 64×64 processing blocks to assure 8-bit precision, the maximum number of digits to be operated theoretically exceeds 32 bits and becomes 40 bits in the next step. For this reason, in this step, processing for preventing overflow is performed. The reason why the value Seido2 is 10 is to provide a margin to the processing block unit.

In step S1309, Tmp is multiplied by the histogram value HIST[K].

In step S1310, Tmp is added to a cumulative variable Sum2, and Tmp×(K×Seido1−AV') is added to a cumulative variable Sum3.

In step S1311, the end of the processing loop of the skew value calculation processing is discriminated by checking if K=END.

In step S1312, K is incremented by 1, and the flow returns to step S1307.

In step S1313, Sum3 is divided by Sum2 to obtain the skew value SK, which is divided by Seido1 determined in step S1301 so as to eliminate unbalance of the effective digit number saving variables (numerator=cubic term, while denominator=square term) between the numerator and denominator (Sum3 and Sum2).

In this manner, the numeric operation processing ends.

The average value AV calculation processing and the skew value calculation processing of this embodiment are executed as described above. However, the present invention is not limited to the above-mentioned determination conditions of the effective digit number saving variables Seido1 and Seido2.

As described above, according to the numeric operation processing of this embodiment, since the operand is multiplied by the effective digit number saving variable determined by the processing environment of the computer, desired precision can be maintained for the decimal part even in the integer operation. Also, since the operand is divided by the effective digit number saving variable calculated in units of loops each including the calculations of the average value and the skew value, the arithmetic operation result can be prevented from exceeding the integer effective number range that can be processed by the computer. In this way, the numeric operation method of high-speed image processing can be obtained while maintaining predetermined precision.

<Image Feature Discrimination Processing>

Figure 5:
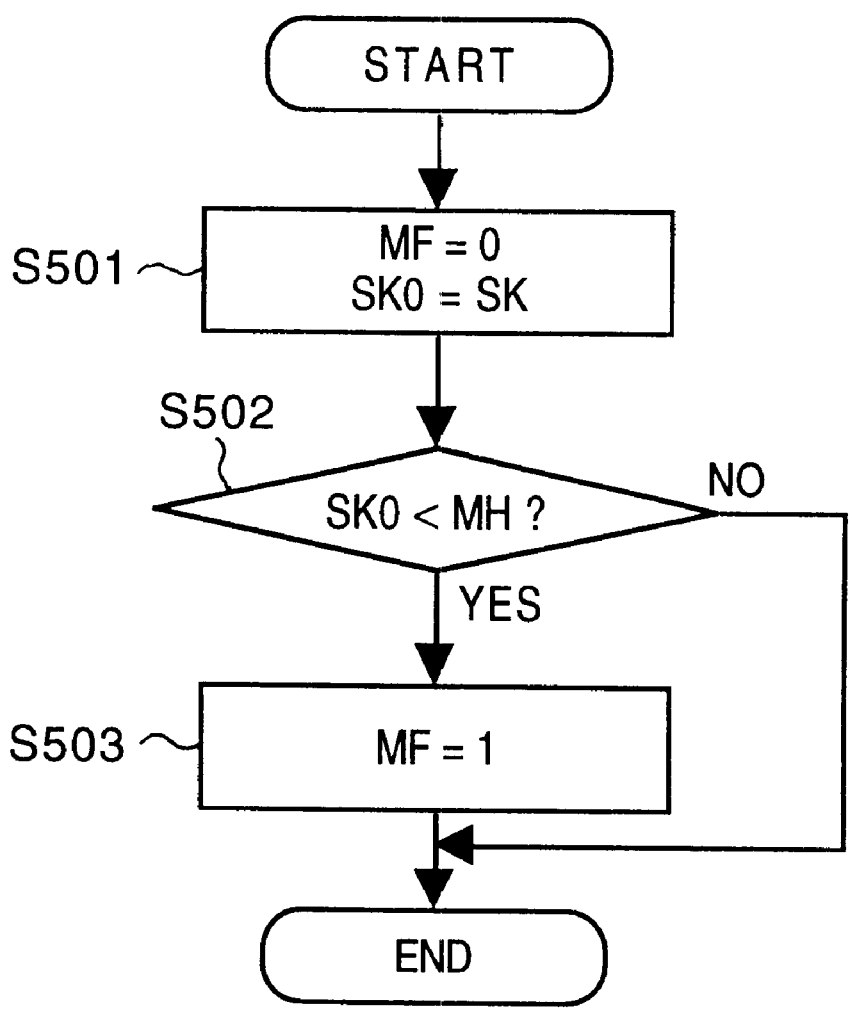
FIG. 5 is a flow chart showing the image feature discrimination processing in the embodiment shown in FIG. 1.

The image feature discrimination processing in step S405 will be described in detail below with reference to FIG. 5. In step S501, "0" is set in the character flag MF indicating whether or not the block being processed is a "character block". Also, the skew value SK is set in SK0 indicating the initial skew value in the threshold value determination processing loop (this is because the image feature discrimination processing is performed in only the first loop of the threshold value determination processing loops). In step S502, it is checked using equation (5) below if the block being processed is a "character block":

$$SK0 < MH \qquad (5)$$

where MH is the value indicating whether or not the block being processed is a "character block", and is set to be "MH=−20.0" in this case. If relation (5) holds in step S502, the flow advances to step S503; otherwise, this image feature discrimination processing ends. In step S503, "1" is set in a character flag MH indicating that the block being processed is a "character block", thus ending the image feature discrimination processing.

As described above, the image feature discrimination processing of this embodiment is performed. However, the present invention is not limited to the condition defined by relation (5).

<Battered Character Processing>

Figure 6:
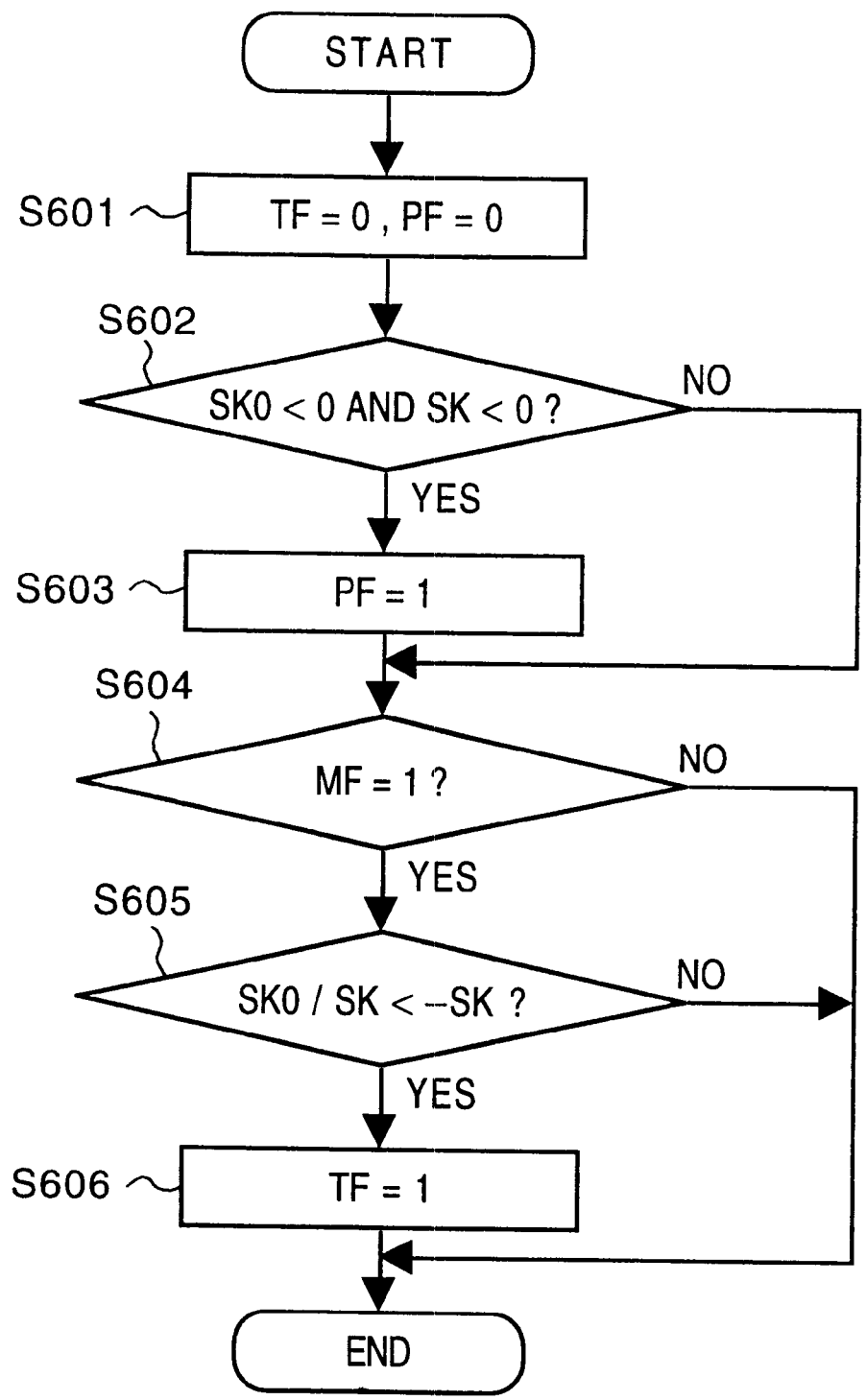
FIG. 6 is a flow chart showing the battered character processing in the embodiment shown in FIG. 1.

The battered character processing in step S408 will be described in detail below with reference to FIG. 6. In step S601, "0" is set in a battered character flag TF indicating whether or not the block being processed is a "battered character block". Also, "0" is set in a flag PF indicating that the skew of the histogram of the block being processed is large. In step S602, it is checked if both the skew value SK0 in the first loop of the threshold value determination processing loop and the skew value SK in the loop in processing are negative values. If Y in step S602, "1" is set in the flag PF in step S603. It is checked in step S604 if the character flag MF is "1". If Y in step S604, the flow advances to step S605; otherwise, this battered character processing ends. In step S605, it is checked using relation (6) below if the block being processed is a "battered character block":

$$SK0/SK < -SR \quad (6)$$

where −SR is the value indicating whether or not the block being processed is a "battered character block", and is set to be "−SR=−3.0" in this case. If relation (6) holds in step S605, the flow advances to step S606; otherwise, this battered character processing ends. In step S606, "1" is set in the battered character flag TF indicating that the block being processed is a "battered character block", thus ending this battered character processing.

As described above, the battered character processing of this embodiment is performed. However, the present invention is not limited to the condition defined by relation (6).

<Blurred Character Processing>

Figure 7:
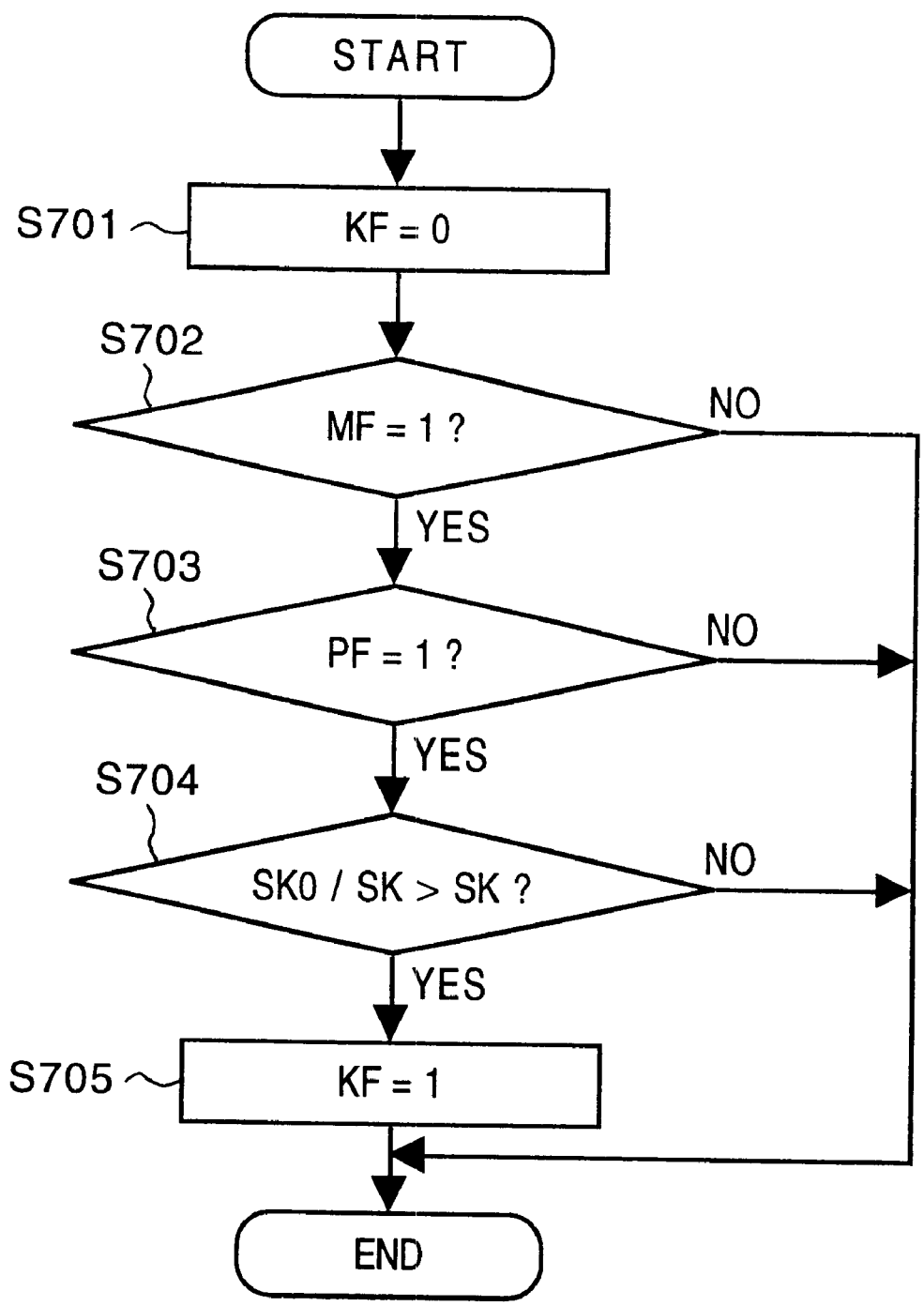
FIG. 7 is a flow chart showing the blurred character processing in the embodiment shown in FIG. 1.

The blurred character processing in step S410 will be described in detail below with reference to FIG. 7. In step S701, "0" is set in a blurred character flag KF indicating whether or not the block being processed is a "blurred character block". In step S702, it is checked if the character flag MF is "1" (to check if the block being processed is a character block). If Y in step S702, the flow advances to step S703; otherwise, this blurred character processing ends. In step S703, it is checked if the flag PF is "1". If Y in step S703, the flow advances to step S704; otherwise, this blurred character processing ends. It is checked in step S704 using relation (7) below if the block being processed is a "blurred character block":

$$SK0/SK > SR \quad (7)$$

where SR is the value indicating whether or not the block being processed is a "blurred character block", and is set to be "SR=3.0" in this case. If relation (7) holds in step S704, the flow advances to step S705; otherwise, this blurred character processing ends. In step S705, "1" is set in the blurred character flag KF indicating that the block being processed is a "blurred character block", thus ending this blurred character processing.

As described above, the blurred character processing in this embodiment is performed. However, the present invention is not limited to the condition defined by relation (7).

The threshold value determination processing of this embodiment will be described in more detail below with reference to examples of images.

The determination processing of the binarization threshold value TH in FIG. 4 in this embodiment will be described below using an example of the histogram shown in FIG. 8.

Figure 8:
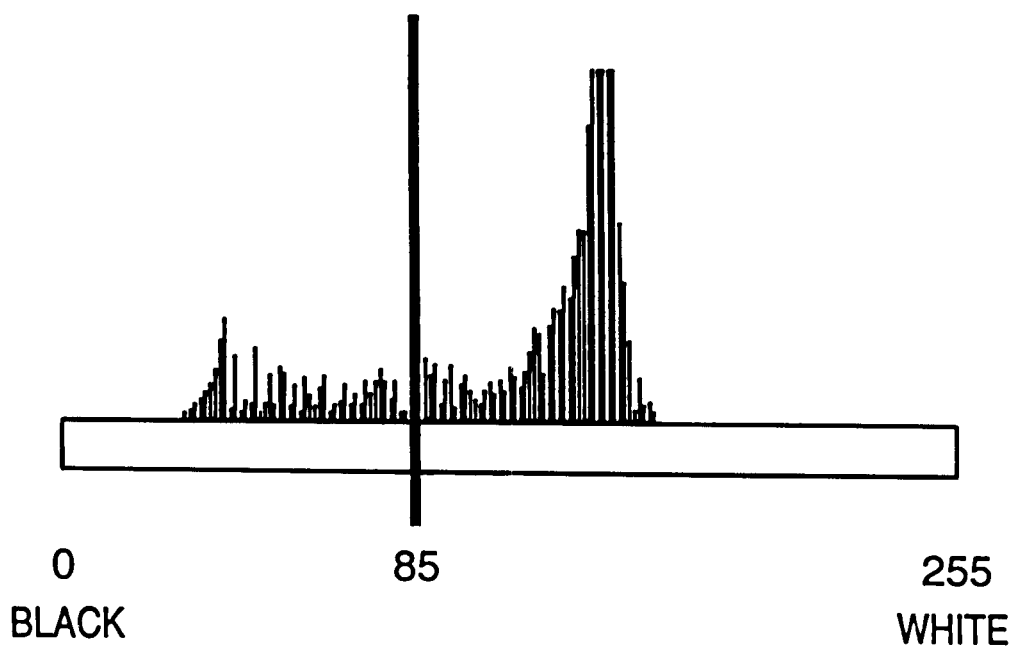
FIG. 8 is a view showing an example of the histogram of a battered character image in the embodiment shown in FIG. 1.

FIG. 8 shows the histogram of a battered character image (8-bit input). In FIG. 8, the abscissa plots digital values of luminance levels (the left end="0", i.e., black; the right end="255", i.e., white), and the ordinate plots the frequencies of the digital values. FIG. 9 shows changes in parameter values when the processing in steps S402 and S403 in the above-mentioned binarization processing shown in FIG. 4 is performed for an image having the histogram shown in FIG. 8. Note that FIG. 9 shows the parameter values in correspondence with the number of loops of steps S402 and S403.

In the first loop of processing in steps S402 and S403 (the threshold value determination processing loop count i=0), the average value AV and the skew value SK are calculated using START=0 and END=255 to respectively yield values "109" and "−27.4". Since i=0, the flow advances from step S404 to step S405. In the image feature discrimination processing in step S405, relation (5) holds since the skew value SK is less than "−20.0", and "1" is set in the character flag MF. In step S414, START=0 and END=109 are set.

In the second loop of processing (i=1), the average value AV and the skew value SK are calculated using START=0 and END=109 to respectively yield values "62" and "8.9". Since the skew value SK exceeds "0.1", the flow advances from step S406 to step S407, and since i=1, the flow advances to step S408. In step S408, since the skew value SK is a positive value, the flag PF remains "0". Since relation (6) holds since "−3.08 (=−27.4/8.9)", "1" is set in the battered character flag TF. In step S410, since the flag PF remains "0", the flag KF also remains "0". Furthermore, since the skew value SK is a positive value, START=62 and END=109 are set in step S413.

In the third loop of processing (i=2), the average value AV and the skew value SK are calculated using START=62 and END=109 to respectively yield values "84" and "1.9". In this case, since the skew value SK exceeds "0.1", the flow proceeds with steps S407 and S409 in turn. Since the skew value SK is a positive value, START=84 and END=109 are set in step S413.

Subsequently, in the fourth loop of processing (i=3), the average value AV and the skew value SK are calculated using START=84 and END=109 to respectively yield values "96" and "0.6". In this case, since the skew value SK exceeds "0.1", the processing continues. Also, since the skew value SK is a positive value, START=96 and END=109 are set in step S413.

In the fifth loop of processing (i=4), the average value AV and the skew value SK are calculated using START=96 and END=109 to respectively yield values "102" and "−0.3". In this case, since the skew value SK is less than "−0.1", the processing continues. Also, since the skew value SK is a negative value, START=96 and END=102 are set in step S414.

In the sixth loop of processing (i=5), the average value AV and the skew value SK are calculated using START=96 and END=102 to respectively yield values "98" and "0.3". In this case, since the skew value SK exceeds "0.1", the processing continues. Also, since the skew value SK is a positive value, START=98 and END=102 are set in step S413.

In the seventh loop of processing (i=6), the average value AV and the skew value SK are calculated using START=98 and END=102 to respectively yield values "99" and "0.4". In this case, since the skew value SK exceeds "0.1", the processing continues. Also, since the skew value SK is a positive value, START=99 and END=102 are set in step S413.

In the eighth loop of processing (i=7), the average value AV and the skew value SK are calculated using START=99 and END=102 to respectively yield values "100" and "0.2". In this case, since the skew value SK exceeds "0.1", the processing continues. Also, since the skew value SK is a positive value, START=100 and END=102 are set in step S413.

Subsequently, in the ninth loop of processing (i=8), the average value AV and the skew value SK are calculated using START=100 and END=102 to respectively yield values "101" and "−0.2". In this case, since the skew value SK is less than "−0.1", the processing continues. Also, since the skew value SK is a negative value, START=100 and END=101 are set in step S414.

Finally, in the 10th loop of processing (i=9), the average value AV and the skew value SK are calculated using START=100 and END=101 to respectively yield values "100" and "0.2". In this case, although the skew value SK exceeds "0.1", since the threshold value determination processing loop count i is "9", the flow advances to step S416 as a result of discrimination in step S409, and the average value "100" is set in the threshold value TH, thus ending this threshold value determination processing. However, in the block of this example, since "1" is set in the battered character flag TF, YES is determined in step S305 in FIG. 3, and the threshold value is limited in step S306. Hence, TH is set with "85 (=(100×0.85)". After the smoothing processing of the threshold value TH in step S308, binarization is performed in step S309. (In this case, TP is set with "0.85".) The binarized image is stored in the storage unit 5.

The determination processing of the binarization threshold value TH in FIG. 4 in this embodiment will be described below using an example of the histogram shown in FIG. 10.

Figure 10:
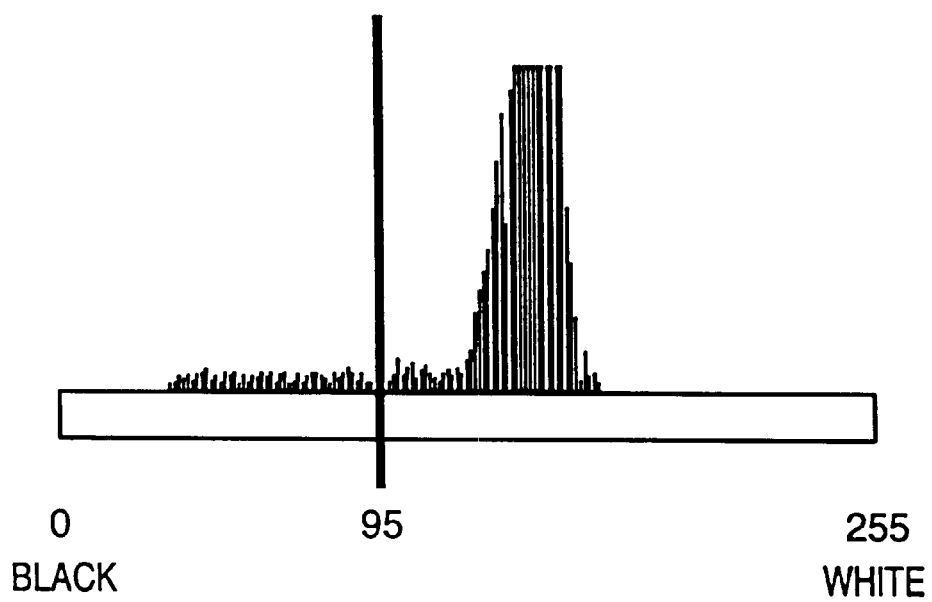
FIG. 10 is a view showing an example of the histogram of a blurred character image in the embodiment shown in FIG. 1.

FIG. 10 shows the histogram of a blurred character image (8-bit input). FIG. 11 shows changes in parameter values when the processing in steps S402 and S403 in the above-mentioned binarization processing shown in FIG. 4 is performed for an image having the histogram shown in FIG. 10. Note that FIG. 11 shows the parameter values in correspondence with the number of loops of steps S402 and S403.

In the first loop of processing in steps S402 and S403 (the threshold value determination processing loop count i=0), the average value AV and the skew value SK are calculated using START=0 and END=255 to respectively yield values "130" and "−60.2". Since i=0, the flow advances from step S404 to step S405. In the image feature discrimination processing in step S405, relation (5) holds since the skew value SK is less than "−20.0", and "1" is set in the character flag MF. In step S414, START=0 and END=130 are set.

Subsequently, in the second loop of processing (i=1), the average value AV and the skew value SK are calculated using START=0 and END=130 to respectively yield values "95" and "−19.3". Since the skew value SK exceeds "0.1", the flow advances from step S406 to step S407, and since i=1, the flow advances to step S408. In step S408, since both the skew values SK and SK0 are negative values, "1" is set in the flag PF. Also, since relation (6) does not hold since "3.11 (=−60.2/−19.3)", the battered character flag TF remains "0". In the blurred character processing in step S410, since both the character flag MF and the flag PF are "1", relation (7) is calculated in step S704. As relation (7) holds since the calculation result yields "3.11 (=−60.2/−19.3)", "1" is set in the blurred character flag KF. Since the blurred character flag KF is "1", the flow advances from step S411 to step S416, and the average value AV "95" is set in the threshold value TH, thus ending this threshold value determination processing. After the smoothing processing of the threshold value TH in step S308 in FIG. 3, binarization is performed in step S309, and the binarized image is stored in the storage unit 5.

<Smoothing Processing>

The smoothing processing in step S308 in FIG. 3 will be described below with reference to FIGS. 12 to 16.

Figure 12:
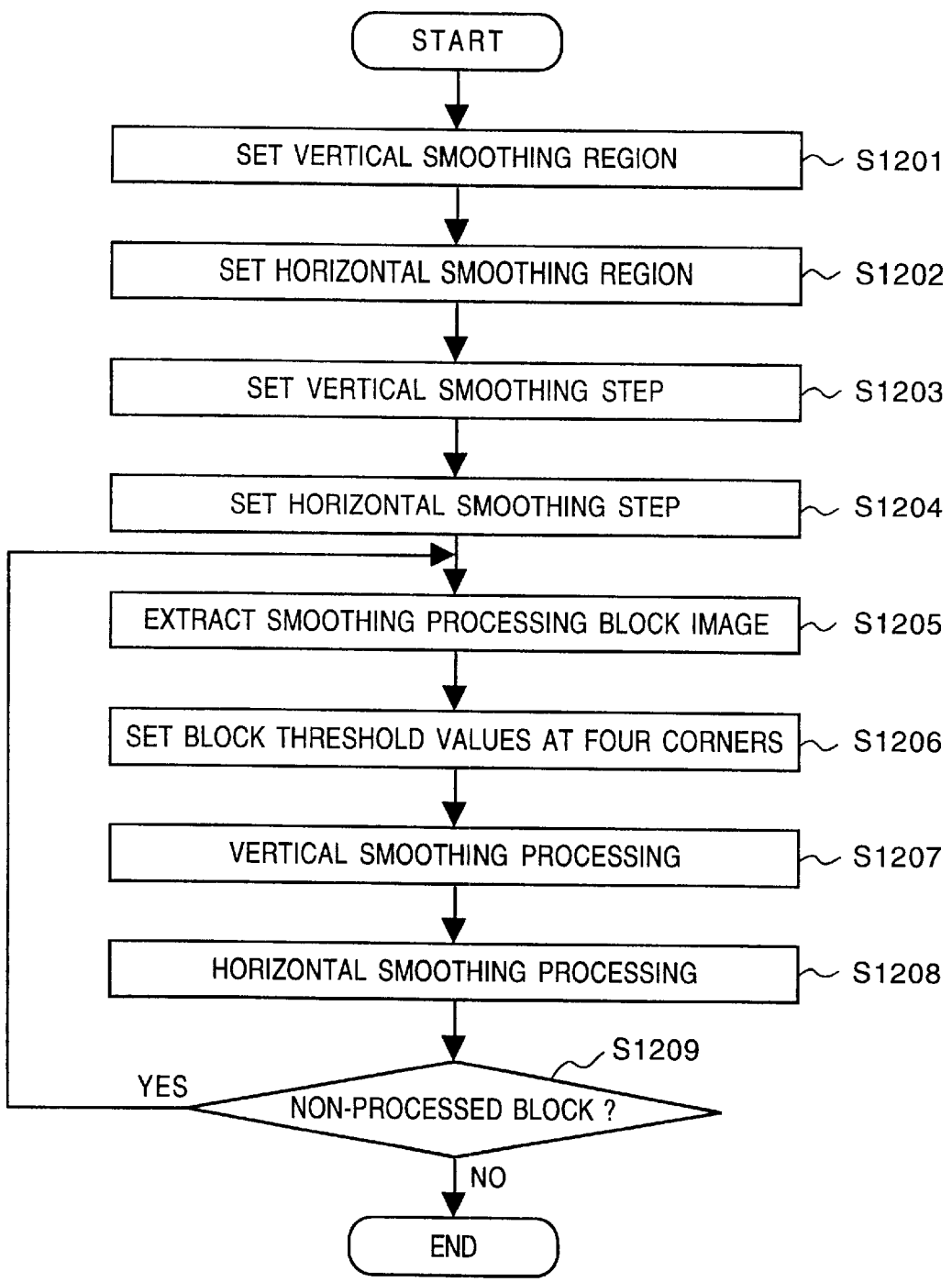
FIG. 12 is a flow chart showing the smoothing processing in the embodiment shown in FIG. 1.

FIG. 12 is a flow chart which best expresses the configuration of the smoothing processing in step S308 in FIG. 3. Referring to FIG. 12, steps S1201 to S1204 are those of setting various parameters of the smoothing processing performed in units of blocks. That is, in step S1201, a vertical smoothing region of the block to be smoothed is set. In step S1202, a horizontal smoothing region of the block to be smoothed is set. In step S1203, a vertical smoothing step of the block to be smoothed is set. In step S1204, a horizontal smoothing step of the block to be smoothed is set. Steps S1205 to S1209 are those of executing smoothing of the binarization threshold value in units of blocks on the basis of the parameters set in steps S1201 to S1204. In step S1205, a smoothing processing block image is extracted. In step S1206, the threshold values at the four corners of the block to be smoothed are set. In step S1207, vertical smoothing processing is performed. In step S1208, horizontal smoothing processing is performed. It is then checked in step S1209 if a non-processed block to be smoothed remains. If such block remains, the flow returns to step S1205 to continue the smoothing processing; otherwise, the processing ends.

In order to explain the respective steps in detail, the relationship between the blocks used for calculating the threshold values in units of blocks in the loop of steps S301 to S307 in FIG. 3, and the blocks subjected to the smoothing processing will be described, and thereafter, steps S1201 to S1209 will be described in detail.

Figure 13:
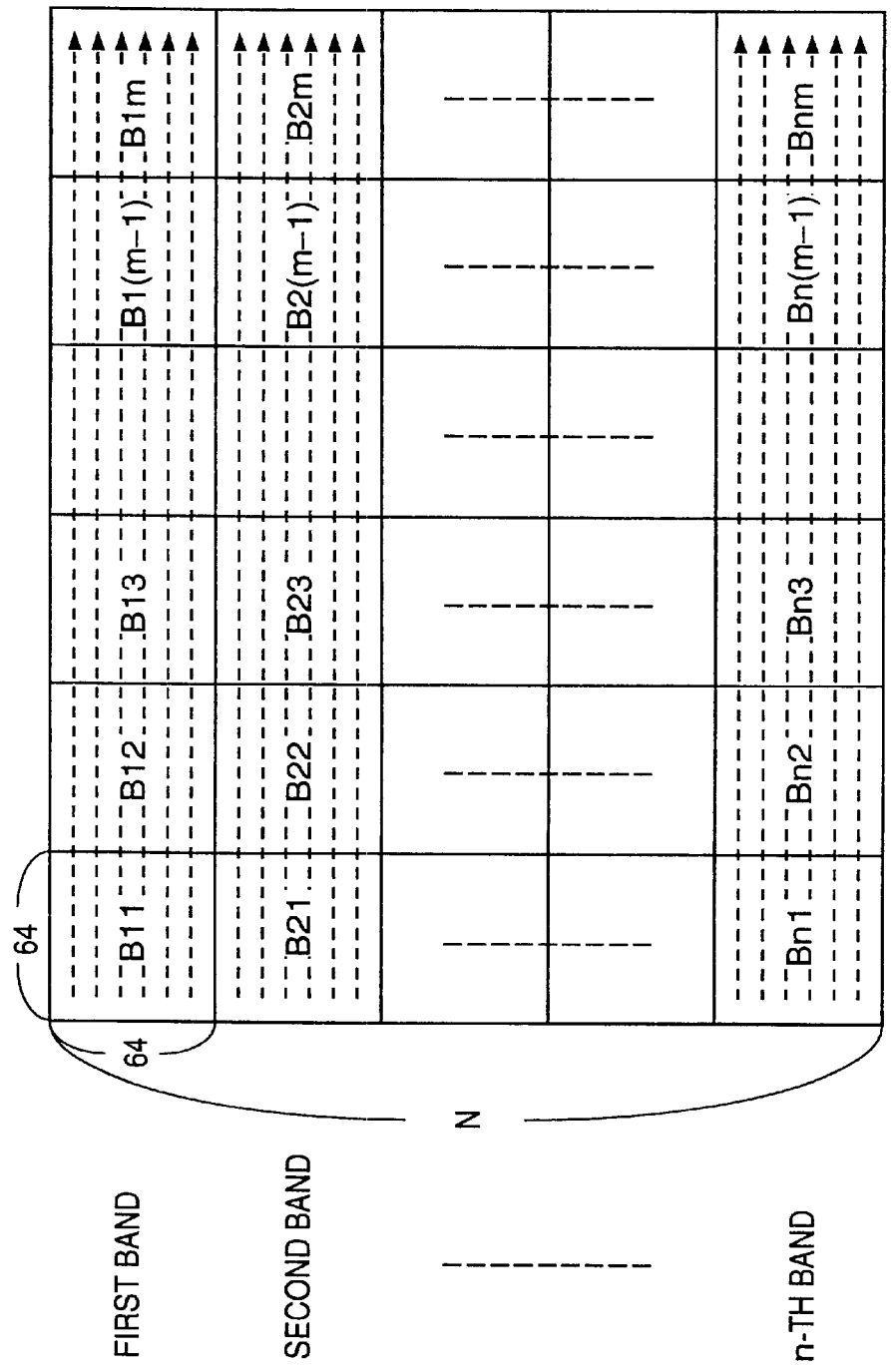
FIG. 13 is a view showing blocks in a loop of calculating threshold values in units of blocks in steps S301 to S307 in FIG. 3.

FIG. 13 shows the unit blocks used for calculating the threshold values in units of blocks in the loop of steps S301 to S307 in FIG. 3. 64 pixels×64 pixels blocks are formed from the upper left corner, and are assigned Nos. B11 to Bnm. The loop of steps S301 to S307 of calculating the threshold values in units of blocks will be referred to as a block threshold value calculation loop hereinafter, and the threshold value obtained as a result of the calculation will be referred to as a block threshold value hereinafter.

Figure 14:
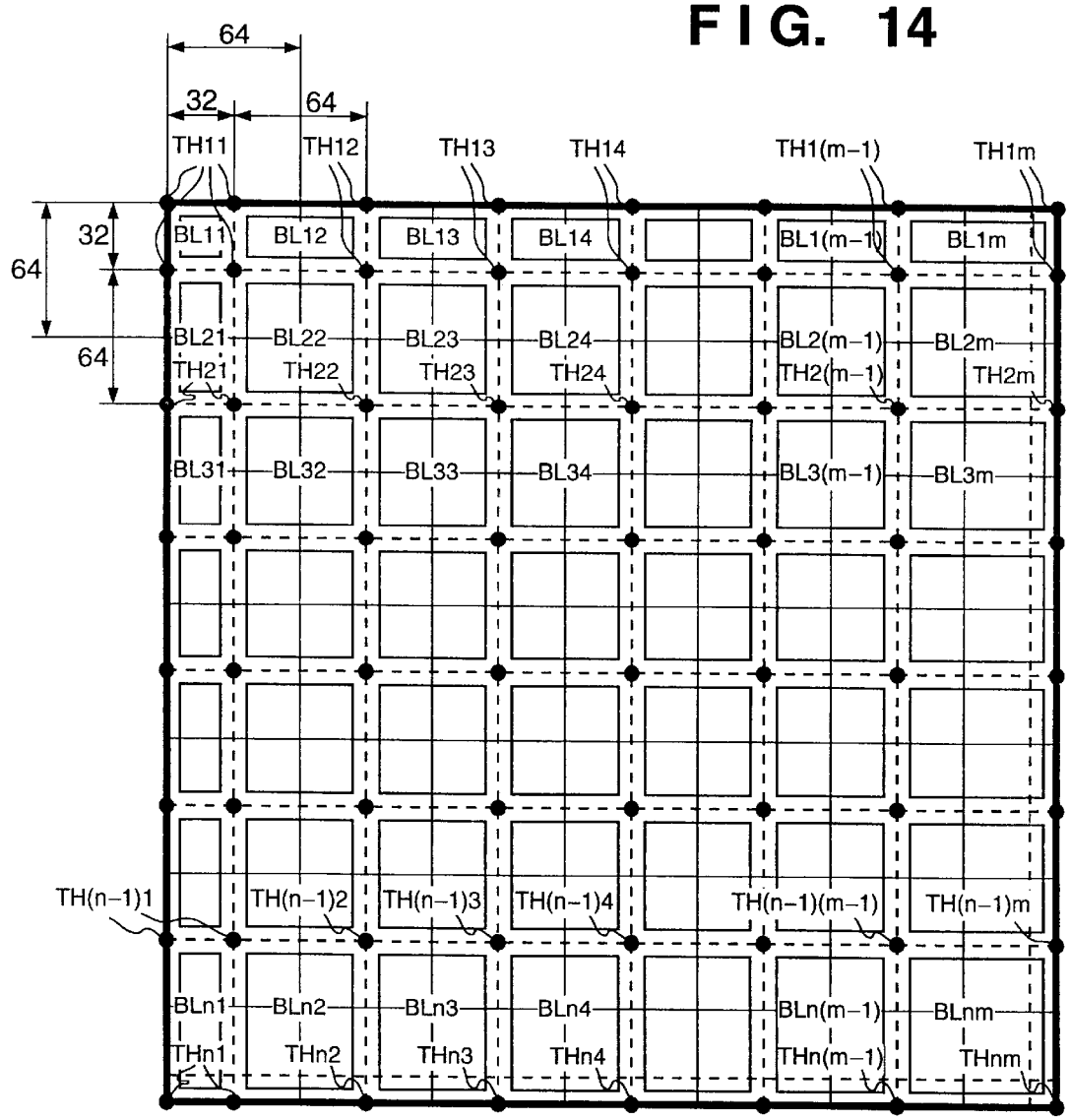
FIG. 14 is a view showing the relationship between the smoothing blocks and block threshold values.

FIG. 14 shows the relationship between the block threshold values for binarization calculated in the block threshold value calculation loops, and the blocks serving as the units of smoothing processing for calculating threshold values in units of pixels. In FIG. 14, the thin solid lines are the same as those dividing the blocks in FIG. 13, and represent 64×64 blocks having the upper left first pixel as the start point. In the block threshold value calculation loops, since the block threshold values are calculated in units of blocks divided by these thin solid lines, each block threshold value can be considered as a threshold value representing the block. Hence, the central point of the block divided by the thin solid lines, i.e., the intersection of the bold dotted lines represents the block threshold value obtained by the block threshold value calculation loop, and in the smoothing processing in step S308, interpolation processing is performed based on the threshold values of at the four corners of blocks divided by the bold dotted lines in units of blocks divided by the bold dotted lines, thereby calculating threshold values in units of pixels of the blocks divided by the bold dotted lines. The blocks divided by the bold dotted lines will be referred to as smoothing blocks hereinafter.

That is, in the smoothing processing in step S308, blocks BL11 BL12, . . . , BL1(m−1), BL1m, BL22, . . . , BLn(m−1), and BLnm are newly defined as smoothing blocks for the smoothing processing, and the block threshold values shown in FIG. 14 are defined at the intersections of the blocks, i.e., the intersections of the bold dotted lines. For example, the threshold values at the four corners of the block BL11 are TH11, TH11, TH11, and TH11, and the threshold values at the four corners of the block BL22 are TH11, TH12, TH21, and TH22. In each smoothing block, vertical or horizontal linear interpolation is performed based on the threshold values at the four corners. For example, in the smoothing processing of the block BL22, linear interpolation in the vertical and horizontal directions is performed using the four threshold values TH11, TH12, TH21, and TH22.

Steps S1201 to S1204 in FIG. 12 will be described below with reference to FIG. 15.

Figure 15:
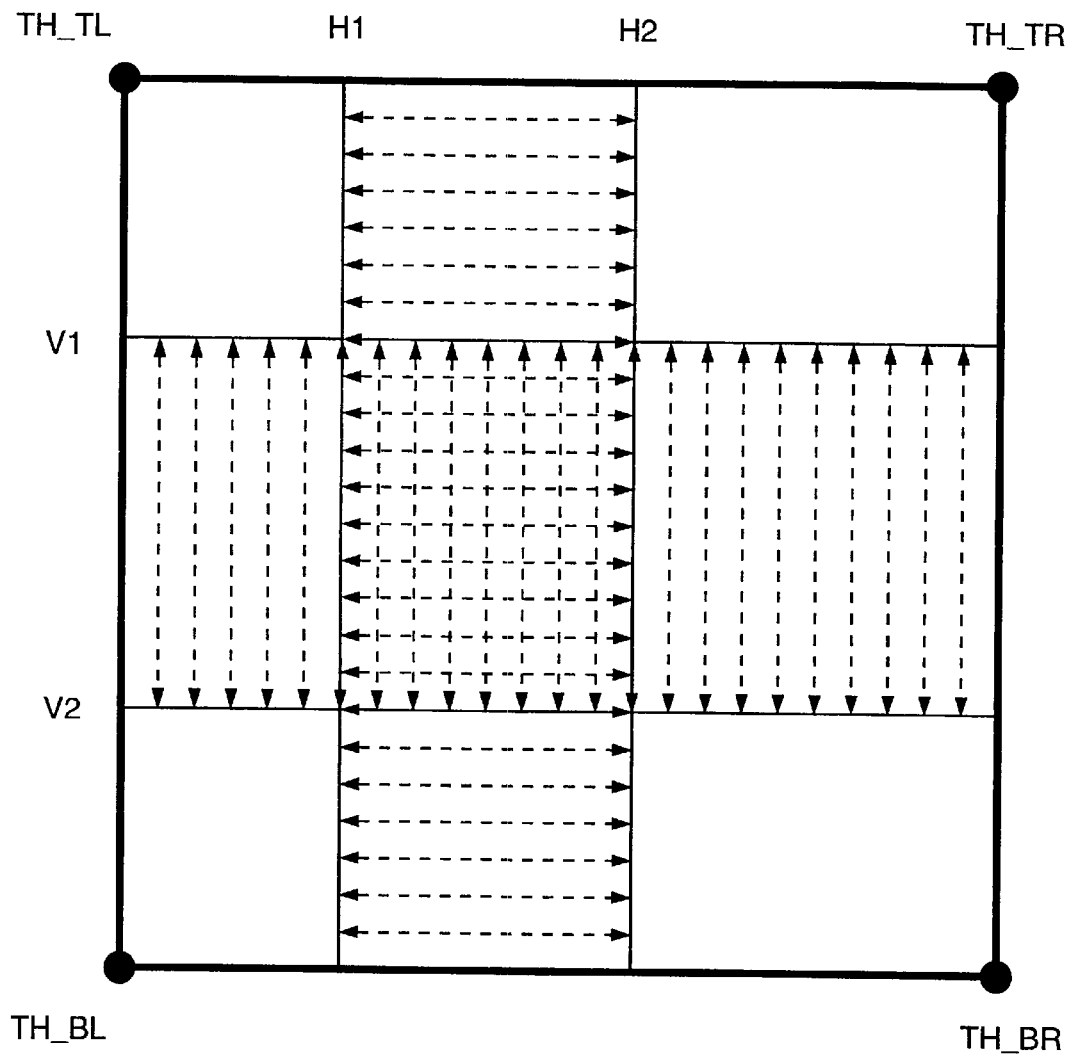
FIG. 15 is a view showing the threshold values at the four corners of a smoothing block, a vertical smoothing region, and a horizontal smoothing region.

In FIG. 15, TH_TL, TH_TR, TH_BL, and TH_BR indicate the block threshold values at the four corners in the smoothing block, and the relationship between the values of TH_TL, TH_TR, TH_BL, and TH_BR in each smoothing block and the block threshold values calculated in the block threshold value calculation loops are as described above.

In step S1201, a vertical smoothing region is set. The vertical smoothing region is a region in which vertical interpolation is performed, and is set by V1 and V2, as shown in FIG. 15. For example, when V1=1 and V2=64, the interpolation operation in the vertical direction is performed for the entire region. On the other hand, when V1=17 and V2=48, for the first to 16th rows in the smoothing block, the interpolation operation in the vertical direction is not performed, and the threshold value for the first row is repetitively used. The 17th to 48th rows are subjected to the interpolation operation in the vertical direction using TH_TL, TH_TR, TH_BL, and TH_BR. The 49th to 64th rows are not subjected to the interpolation operation in the vertical direction, and the threshold value for the 49th row is repetitively used.

In step S1202, a horizontal smoothing region is set. The horizontal smoothing region is a region in which horizontal interpolation is performed, and is set by H1 and H2, as shown in FIG. 15. For example, when H1=1 and H2=64, the horizontal interpolation operation is performed for the entire region. On the other hand, when H1=17 and H2=48, for the first to 16th columns in the smoothing block, the horizontal interpolation operation is not performed, and the threshold value for the first column is repetitively used. The 17th to 48th columns are subjected to the horizontal interpolation operation using TH_TL, TH_TR, TH_BL, and TH_BR. For the 49th to 64th columns, the horizontal interpolation operation is not performed, and the threshold value for the 49th column is repetitively used.

Therefore, in FIG. 15, a rectangular region, which has a point (0, 0) as the upper left corner and a point (H1, V1) as the lower right corner, repetitively uses the value TH_TL, a rectangular region, which has a point (H2, 0) as the upper left corner and a point (64, V1) as the lower right corner, repetitively uses the value TH_TR, a rectangular region, which has a point (0, V2) as the upper left corner and a point (H1, 64) as the lower right corner, repetitively uses the value TH_BL, and a rectangular region, which has a point (H2, V2) as the upper left corner and a point (64, 64) as the lower right corner, repetitively uses the value TH_BR. A rectangular region, which has a point (0, V1) as the upper left corner and a point (H1, V2) as the lower right corner, and a rectangular region, which has a point (H2, V1) as the upper left corner and a point (64, V2) as the lower right corner, are subjected to the interpolation operation in only the vertical direction, and a rectangular region, which has a point (H1, 0) as the upper left corner and a point (H1, V2) as the lower right corner, and a rectangular region, which has a point (H1, V2) as the upper left corner and a point (H2, 64) as the lower right corner, are subjected to the interpolation operation in only the horizontal direction. Furthermore, a rectangular region, which has a point (H1, V1) as the upper left corner and a point (H2, V2) as the lower right corner, is subjected to the interpolation operations in both the vertical and horizontal directions.

As described above, as the vertical or horizontal smoothing region becomes smaller, the number of interpolation operations for smoothing decreases, and the total time for the smoothing processing can be shortened. However, as the smoothing region becomes smaller, changes in image data at the boundary of blocks become steeper, resulting in characteristics that readily cause block distortion. Since this embodiment allows variable region setting, a smoothing region optimal to the particular resolution of each input apparatus or input image can be set.

In step S1203, a vertical smoothing step is set. The vertical smoothing step is a value indicating the number of pixels to be skipped upon executing the interpolation operation in the vertical smoothing region set in step S1201, and is set by VSTEP. For example, when the vertical smoothing step VSTEP is 1, the interpolation operation is performed every other pixels; when VSTEP is 4, the interpolation operation is performed every fifth pixels. When the interpolation operation is performed while skipping a plurality of pixels, a value obtained by the interpolation operation is repetitively used for the values of the skipped pixels. For example, when V1=1, V2=64, and the vertical smoothing step VSTEP=16, the values of the first, 17th, 33rd, and 49th rows are calculated by the interpolation operation using the block threshold values at the four corners. The second to 16th rows repetitively use the value of the first row, the 18th to 32nd rows repetitively use the value of the 17th row, the 34th to 48th rows repetitively use the value of the 33rd row, and the 50th to 64th rows repetitively use the value of the 49th row.

In step S1204, a horizontal smoothing step is set. The horizontal smoothing step is a value indicating the number of pixels to be skipped upon executing the interpolation operation in the horizontal smoothing region set in step S1202, and is set by HSTEP. For example, when the horizontal smoothing step HSTEP is 1, the interpolation operation is performed every other pixels; when HSTEP is 4, the interpolation operation is performed every fifth pixels. When the interpolation operation is performed while skipping a plurality of pixels, a value obtained by the interpolation operation is repetitively used for the values of the skipped pixels. For example, when H1=1, H2=64, and the horizontal smoothing step HSTEP=16, the values of the first, 17th, 33rd, and 49th columns are calculated by the interpolation operation using the block threshold values at the four corners. The second to 16th columns repetitively use the value of the first column, the 18th to 32nd columns repetitively use the value of the 17th column, the 34th to 48th columns repetitively use the value of the 33rd column, and the 50th to 64th columns repetitively use the value of the 49th column.

Therefore, as the vertical or horizontal smoothing step becomes bigger, the number of interpolation operations for smoothing decreases, and the calculation time for the smoothing processing can be shortened. However, when the smoothing step becomes bigger, changes in threshold value of the smoothing region become coarser, resulting characteristics that readily cause block distortion. Since this embodiment allows variable region setting, a smoothing step optimal to the resolution of each input apparatus or input image can be set.

Prior to the description of the interpolation operation loop including steps S1205 to S1209, the vertical and horizontal interpolation operation methods will be described with reference to FIG. 15, and thereafter, a description of the interpolation operation loop will be given. In FIG. 15, as for the vertical interpolation operation, VLi (i=1, 2, ... , (V2−V1+1)/VSTEP) represents the vertical interpolation processing result using TH_TL and TH_BL, and VRi (i=1, 2, ... , (V2−V1+1)/VSTEP) represents the vertical interpolation processing result using TH_TR and TH_BR. Then, VLi and VRi are respectively described by:

$$VLi=TH\_TL+(i-1)*(TH\_BL-TH\_TL)/((V2-V1+1)/VSTEP) \quad (12\text{-}1)$$

$$VRi=TH\_TR+(i-1)*(TH\_BR-TH\_TR)/((V2-V1+1)/VSTEP) \quad (12\text{-}2)$$

The horizontal interpolation processing of each row is performed using these VLi and VRi. If Hij (i=1, 2, ... , (V2−V1+1)/VSTEP, j=i=1, 2, ... , (H2−H1+1)/HSTEP) represents the horizontal interpolation result, Hij can be expressed by:

$$Hij=VLi+(j-1)*(VRi-VLi)/((H2-H1+1)/HSTEP \quad (12\text{-}3)$$

where (V2−V1+1)/VSTEP represents the number of interpolation operations per vertical line, and (H2−H1+1)/HSTEP represents the number of interpolation operations per horizontal line.

FIG. 16 shows the calculation results of the threshold values in the smoothing block from equations (12-1), (12-2), and (12-3) above, when V1=1, V2=64, H1=1, H2=64, VSTEP=1, HSTEP=1, TH_TL=32, TH_TR =96, TH_BL= 96, and TH_BR=160.

The processing of the loop including steps S1205 to S1209 will be explained in detail below. This loop performs processing in units of smoothing blocks BL11, BL12, ... , BL1(m−1), BL1m, BL21, BL22, ... , BLn(m−1), BLnm shown in FIG. 14.

In step S1205, image data of the block BL11 is extracted.

In step S1206, the threshold values TH_TL=TH11, TH_TR=TH11, TH_BL=TH11, and TH_BR=TH11 at the four corners of the block BL11 are set.

In step S1207, vertical smoothing processing is performed. In this case, since TH_TL and TH_BL have the same values and TH_TR and TH_BL have the same values, no vertical interpolation operation is performed, and the same value TH11 is repetitively used.

In step S1208, horizontal interpolation processing is performed. However, in this case as well, no horizontal interpolation operation is performed since the values at the right and left ends are equal to each other, and the same value TH11 is repetitively used.

In step S1209, since non-processed blocks still remain, the flow returns to step S1205.

Then, the smoothing block BL12 is processed.

In step S1205, image data of the next smoothing block BL12 is extracted.

In step S1206, the block threshold values TH_TL=TH11, TH_TR=TH12, TH_BL=TH11, and TH_BR=TH12 at the four corners are set.

In step S1207, since TH_TL and TH_BL, and TH_TR and TH_BL have the same values, no vertical interpolation operation is performed, and TH11 is repetitively used as VLi, and TH12 is repetitively used as VRi.

In step S1208, the horizontal interpolation operation is performed based on equation (12-3) above. In this case, since VLi=TH11 and VRi=TH12 are always set at i=1, 2, ... , (V2−V1+1)/VSTEP, the value Hij remains the same even when i changes. Therefore, after i=2, the values H1j (j=1, 2, ... , (H2−H1+1)/HSTEP) obtained when i=1 are repetitively used.

In step S1209, since non-processed blocks still remain, the flow returns to step S1205.

The same processing as in the smoothing block BL12 is repeated for the smoothing blocks BL13, BL14, ... , BL1m.

Then, the smoothing block BL21 is processed.

In step S1205, image data of the next smoothing block BL21 is extracted.

In step S1206, the block threshold values TH_TL=TH11, TH_TR=TH11, TH_BL=TH21, and TH_BR=TH21 at the four corners are set.

In step S1207, the interpolation operations of VLi and VRi are respectively performed based on equations (12-1) and (12-2) to obtain VLi and VRi.

In step S1208, since TH_TL and TH_TR, and TH_BL and TH_BR have the same values, the values VLi and VRi become equal to each other at i=1, 2, ... , (V2−V1+1)/VSTEP. For this reason, only when i=1, no horizontal interpolation operation is performed, and the value VLi is repetitively used as Hij (j=1, 2, ... , (H2−H1+1)/HSTEP). This repetition is made up to i=1, 2, ... , (V2−V1+1)/VSTEP. In step S1209, since non-processed blocks still remain, the flow returns to step S1205.

Then, the smoothing block BL22 is processed.

In step S1205, image data of the next smoothing block BL22 is extracted.

In step S1206, the block threshold values TH_TL TH11, TH_TR=TH12, TH_BL=TH21, and TH_BR=TH22 at the four corners are set.

In step S1207, the interpolation operations of VLi and VRi are respectively performed based on equations (12-1) and (12-2) to obtain VLi and VRi.

In step S1208, the horizontal interpolation operation is performed based on equation (12-3) above to obtain Hij.

In step S1209, since non-processed blocks still remain, the flow returns to step S1205.

The same processing is repeated up to BLnm, thus ending the smoothing processing of binarization threshold values of the entire image in step S308.

As described above, according to the threshold value determination method of this embodiment, the luminance frequencies are calculated in units of blocks in a multivalued image, the binarization threshold values are calculated in units of blocks on the basis of the luminance frequencies, and the binarization threshold values in units of pixels are calculated by interpolating the binarization threshold values in units of blocks. That is, appropriate threshold values can be automatically set between the object and background density in units of blocks in an image, and the binarization threshold values can be automatically set in units of pixels. In this way, a binary image in which the object can be appropriately separated from the background in both the character portion and the portion other than the character portion in an image, and which is free from any block distortion can be obtained.

<Another Example of Smoothing Processing>

In the above embodiment, upon execution of the smoothing processing, vertical smoothing processing is performed, and thereafter, horizontal smoothing processing is performed. However, the present invention is not limited to this order, and the vertical smoothing processing may be performed after the horizontal smoothing processing.

In the above embodiment, smoothing blocks are defined to execute the smoothing processing, and the interpolation operation is performed in units of smoothing blocks. However, the present invention is not limited to this such arithmetic operation order, and the smoothing processing may be realized by variously dividing an image in the vertical and horizontal directions. For example, after the interpolation operation of the first line of the entire image region, the interpolation operation may be performed in the raster order like the second line, third line, . . . Furthermore, each of the smoothing blocks BL21, BL22, BL2m, BL31, . . . , BLnm defined in the above embodiment may be further divided into two, upper and lower blocks, and smoothing may be performed in the order of:

BL11, BL12, . . . , BL1m upper BL21, upper BL22, . . . , upper BL2m lower BL21, lower BL22, . . . , lower BL2m upper BL31, upper BL32, . . . , upper BL3m lower BL31, lower BL32, . . . , lower BL3m

. . .

lower BLn1, lower BLn2, . . . , lower BLnm

At this time, when the smoothing parameters are set to be V1=33, V2=64, H1=1, and H2=64, and each smoothing block is divided into to blocks, i.e., a block from the first row to the 32nd row, and a block from the 33rd row to the last row, the upper block is subjected to only horizontal smoothing using TH_TL and TH_TR, and the lower block is subjected to smoothing in the vertical and horizontal directions using the four threshold values, i.e., TH_TL, TH_TR, TH_BL, and TH_BR. In this case, the block BL11, block BL12, . . . , block BL1m, upper block BL21, . . . , and upper block BL2m, can be subjected to the smoothing processing using only the threshold values of the results of the first band in FIG. 13, and the lower block BL21, lower block BL22, . . . , lower block BL2m, upper block BL31, upper block BL32, . . . , and upper block BL3m can also be subjected to the smoothing processing using only the threshold values of the results of the first and second bands in FIG. 13. The lower block BL31 and the subsequent blocks can also be processed in units of bands shown in FIG. 13 by processing the smoothing blocks as a set of upper and lower blocks, and preserving the block threshold values in the immediately preceding band. In this way, when the present invention is to be realized by band processing, the smoothing processing can be realized by single-band processing without preparing a plurality of bands, thus reducing the image band memory capacity.

(Another Embodiment)

In the above embodiment, the input image is an 8-bit multi-valued image data, each pixel of which is expressed by a single color. However, the present invention is not limited to this. For example, each pixel may be expressed by a plurality of colors. More specifically, information of a plurality of bits need only be provided as data to be binarized.

Each processing block of an image upon calculating the histogram has a size of 64 pixels×64 pixels. Alternatively, each block may have a size of 32 pixels×32 pixels. Furthermore, each block may have a square or rectangular shape. That is, each processing block may have a size of 64 pixels×96 pixels. Depending on the capacity of a memory, the entire image may be defined as a processing block.

Upon calculating the histogram, sampling of an image may be performed at all the pixel positions or while skipping several pixels. Furthermore, the average value AV and the skew value SK need not be calculated by 8 bits but may be calculated by a smaller number of bits to attain higher-speed processing, small memory capacity, and the like.

The convergence condition of the skew value SK is defined by "±0.1". However, the present invention is not limited to this specific condition, but another condition may be used as long as the binarization threshold values are determined using the skew value SK. Also, the convergence condition may be changed depending on the image input apparatus and image input condition.

Upon discriminating a character block using relation (5), the character flag MF is set to be "−20.0". However, the present invention is not limited to this, and another condition may be defined to discriminate a character block using the skew value SK. Also, the flag value may be changed depending on the image input apparatus and image input condition.

The SR value is used upon discriminating a battered or blurred character block using relation (6) or (7), and is set to be "3.0". However, the present invention is not limited to this, and another condition may be defined to discriminate a battered or blurred character block using the skew value SK. Also, the SR value may be changed depending on the image input apparatus and image input condition.

The upper- and lower-limit values H and L of each threshold value may be changed depending on the image input apparatus and image input condition.

The constant TP is used for preventing a character from being battered, and is set to be "0.85". However, the present invention is not limited to this, and another condition may be used. For example, the constant may be changed depending on the image input apparatus and image input condition.

The objects of the present invention are also achieved by supplying a storage medium, which records a program code of a software program that can realize the functions of the above-mentioned embodiments to a system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying program codes, for example, a floppy disk, hard disk, optical disk, magneto-optical disk, CD-ROM, CD-R, magnetic tape, nonvolatile memory card, ROM, and the like may be used.

Figure 18:
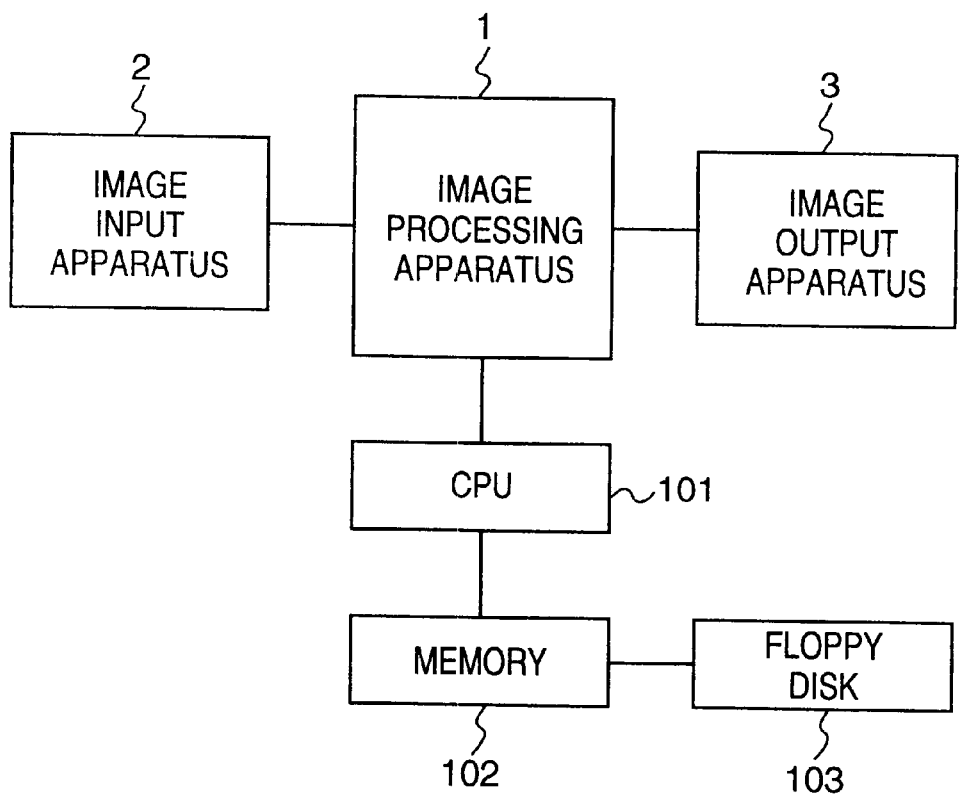
FIG. 18 is a block diagram for explaining an example of a computer program product in an embodiment according to the present invention.

For example, such system will be described below with reference to FIG. 18. In FIG. 18, 1 to 3 correspond to the apparatuses 1 to 3 in FIG. 1, and the present invention is achieved when a CPU 101 of this apparatus loads the program codes stored in a floppy disk 103 onto a memory 102 and executes them.

The functions of the above-mentioned embodiments may be realized not only by executing a readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after a program code read out from the storage medium is written in a memory of the extension board or unit.

Figure 19:
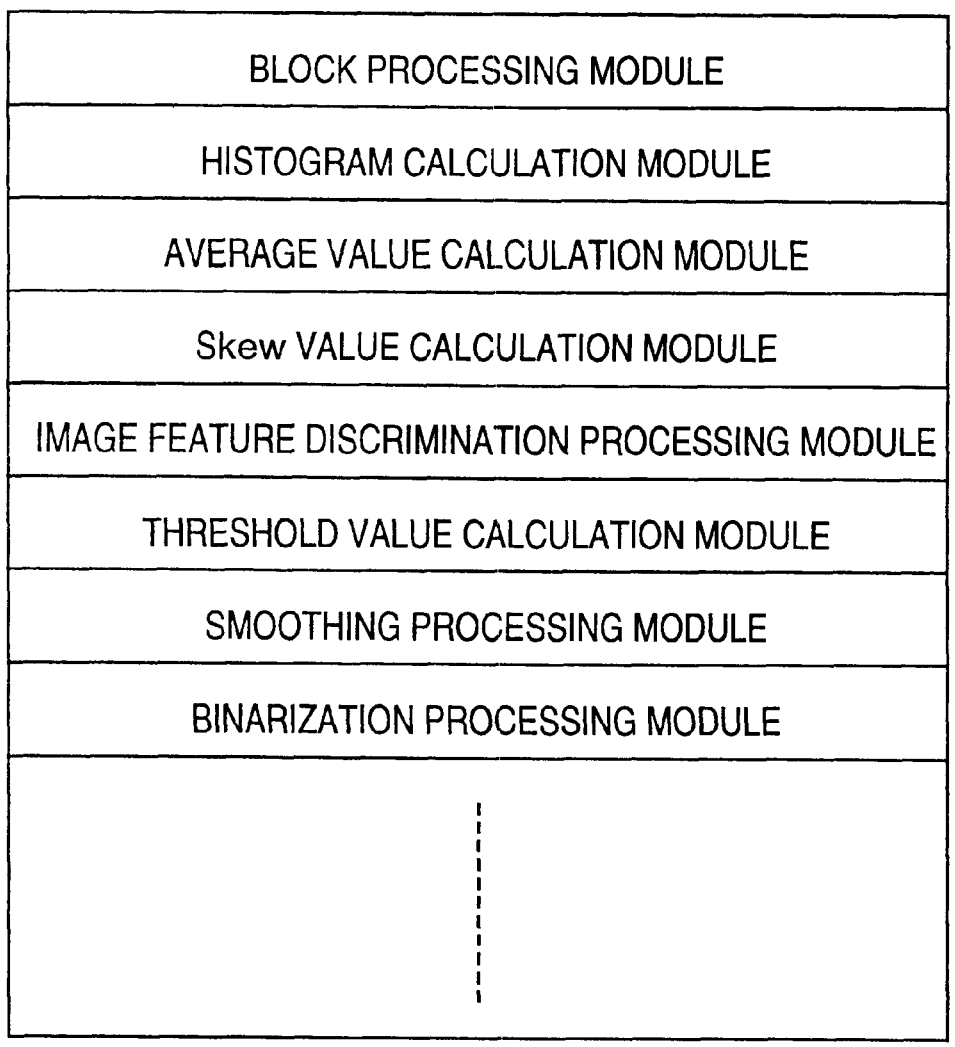
FIG. 19 is a view showing an example of the layout, in a predetermined storage medium, of program modules for executing the image processing as an embodiment of the present invention.

When the present invention is applied to the storage medium, the storage medium stores program codes corresponding to the above-mentioned flow charts. This will be briefly described below. That is, modules shown in an example of the memory map shown in FIG. 19 are stored in the storage medium.

Figure 4:
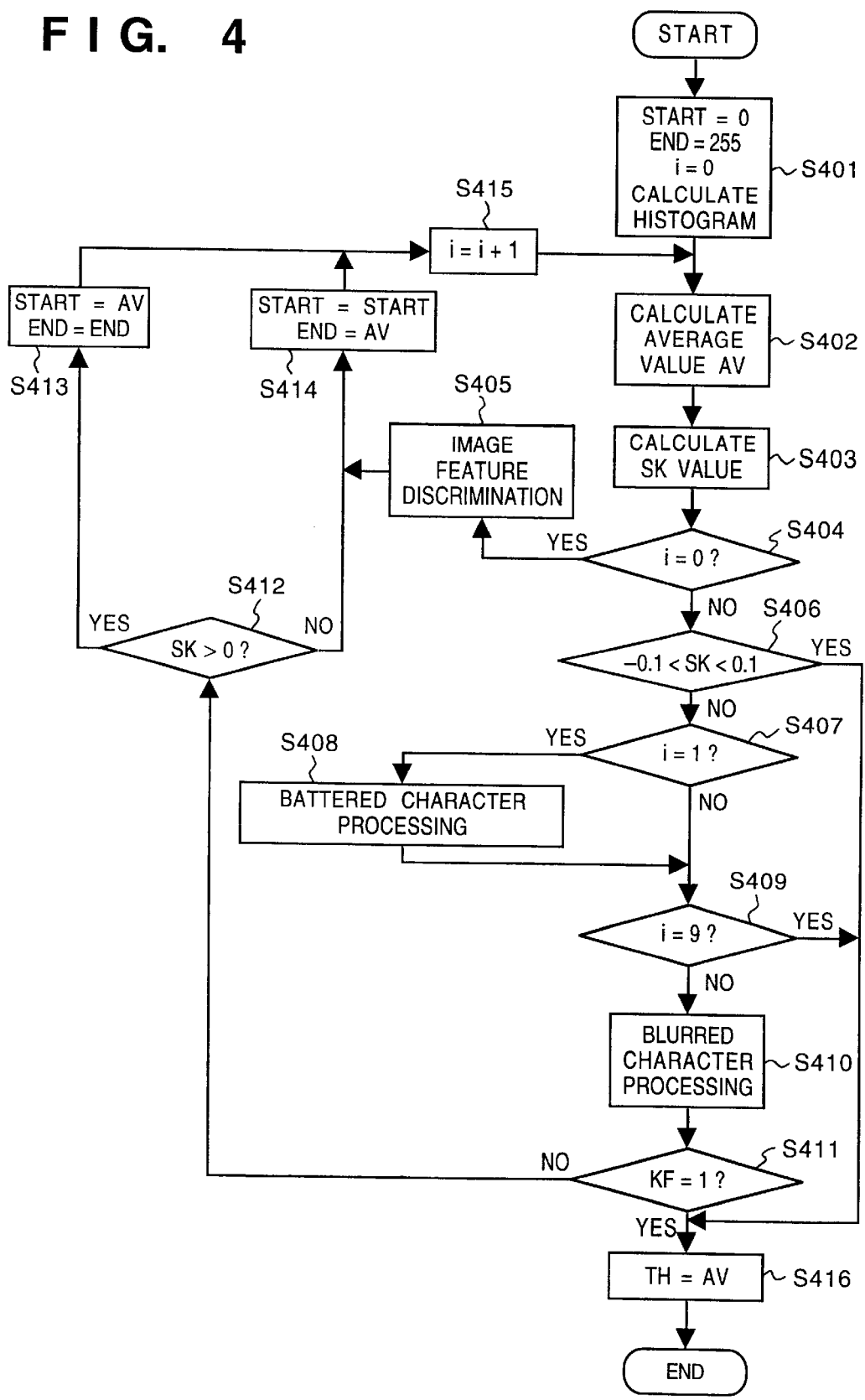
FIG. 4 is a flow chart showing the threshold value determination processing in the embodiment shown in FIG. 1.

More specifically, for example, the storage medium need only store program codes of:

"block processing module" corresponding to the block extraction processing in step S301 in FIG. 3;

"histogram calculation module" corresponding to the histogram calculation processing in step S401 in FIG. 4;

"average value calculation module" corresponding to the average value calculation processing in step S402 in FIG. 4;

"Skew value calculation module" corresponding to the SK value calculation processing in step S403 in FIG. 4;

"image feature discrimination processing module" corresponding to the image feature discrimination processing in step S405 in FIG. 4;

"threshold value calculation module" corresponding to the threshold value calculation processing in step S416 in FIG. 4, the threshold value limiting processing in step S304 in FIG. 3, or the threshold value limiting processing in step S306 in FIG. 3;

"smoothing processing module" corresponding to the smoothing processing in step S308 in FIG. 3; and "binarization processing module" corresponding to the simple binarization processing in step S309 in FIG. 3.

As described above, according to this embodiment, smooth binary expression free from any block distortion can be realized in binarization.

Especially, according to this embodiment, the luminance frequencies are calculated in units of blocks in a multi-valued image, the binarization threshold values are calculated in units of blocks on the basis of the luminance frequencies, and the binarization threshold values in units of pixels are calculated by interpolating the binarization threshold values in units of blocks. That is, appropriate threshold values can be automatically set between the object and background density in units of blocks in an image, and binarization threshold values can be automatically set in units of pixels. In this way, a binary image in which the object can be appropriately separated from the background in both the character portion and the portion other than the character portion in an image, and which is free from any block distortion can be obtained.

Also, block distortion can be removed by interpolation (smoothing processing) of this embodiment. By adjusting the parameters for smoothing, the interpolation processing time for smoothing can be shortened, and interpolation processing corresponding to the characteristics, e.g., resolution, of the input apparatus and input image can be realized. When band processing using an image band memory having the same height as that of a block is applied to the present invention, smoothing can be realized by a single band alone by setting the smoothing parameters, and cost required for the band memory can be reduced.

By multiplying the operand with the effective digit number saving variable determined by the processing environment of the computer, required precision can be maintained for the decimal part even in the integer operation. Also, arithmetic operations can be performed while preventing the arithmetic operation result from exceeding the integer effective number range that can be processed by the computer by dividing the operand by the effective digit number saving variable, which is calculated in units of loops, each including the calculations of the average value and skew value. In this manner, the numeric operation method of high-speed image processing can be obtained while maintaining predetermined precision.

As described above, according to the above embodiments, the luminance frequencies are calculated in units of blocks in a multi-valued image, the binarization threshold values are calculated in units of blocks on the basis of the luminance frequencies, and the binarization threshold values in units of pixels are calculated by interpolating the binarization threshold values in units of blocks. That is, appropriate threshold values can be automatically set between the object and background density in units of blocks in an image, and binarization threshold values can be automatically set in units of pixels. In this way, a binary image in which the object can be appropriately separated from the background in both the character portion and the portion other than the character portion in an image, and which is free from any block distortion can be obtained.

By adjusting the parameters for interpolation, the interpolation processing time for smoothing can be shortened, and interpolation processing corresponding to the characteristics, e.g., resolution, of the input apparatus and input image can be realized.

Furthermore, by multiplying the operand with the effective digit number saving variable determined by the processing environment of the computer, desired precision can be maintained for the decimal part even in the integer operation. Also, arithmetic operations can be performed while preventing the arithmetic operation result from exceeding the integer effective number range that can be processed by the computer by dividing the operand by the effective digit number saving variable, which is calculated in units of loops, each including the calculations of the average value and skew value. In this manner, the numeric operation method of high-speed image processing can be obtained while maintaining predetermined precision.

The present invention has been described by way of its preferred embodiments. However, the present invention is not limited to the above embodiments, and various modifications may be made within the scope of the appended claims.

What is claimed is:

1. An image processing method of obtaining binarization threshold values for converting a multi-valued image into a binary image, said method comprising the steps of:

calculating luminance frequencies of said multi-valued image in units of blocks in said multi-valued image;

calculating first binarization threshold values, in units of blocks, on the basis of the luminance frequencies by specifying an optimal luminance frequency region in the luminance frequencies, calculating an average luminance value in the optimal luminance frequency region, and calculating the first binarization threshold values in units of blocks on the basis of the average luminance value, wherein the specifying includes discriminating a feature of an image on the basis of a skew of the luminance frequencies, and specifying the optimal luminance frequency region on the basis of the feature of the image; and calculating second binarization threshold values, in units of pixels, by interpolating the first binarization threshold old values in units of blocks, wherein, in said step of calculating luminance frequencies, the relation between luminance and frequencies of multi-valued levels of a plurality of pixels is obtained as the luminance frequencies, and in said step of calculating second binarization threshold values in units of pixels, the second binarization threshold values in units of pixels is calculated by interpolating the first binarization threshold values obtained in a plurality of blocks.

2. The method according to claim 1, further comprising the step of binarizing the multi-valued image using the second binarization threshold values in units of pixels.

3. An image processing method of obtaining binarization threshold values for converting a multi-valued image into a binary image, said method comprising the steps of:

calculating luminance frequencies of said multi-valued image in units of blocks in said multi-valued image;

calculating first binarization threshold values, in units of blocks, on the basis of the luminance frequencies by specifying an optimal luminance frequency region in the luminance frequencies, calculating an average luminance value in the optimal luminance frequency region, and calculating the first binarization threshold values in units of blocks on the basis of the average luminance value, wherein the specifying includes discriminating a feature of an image on the basis of a skew of the luminance frequencies, and specifying the optimal luminance frequency region on the basis of the feature of the image;

setting a region for interpolating the first binarization threshold values in units of blocks; and calculating second binarization threshold values, in units of a pixels, by interpolating the first binarization threshold values in units of blocks, with respect to the set region, wherein, in said step of calculating luminance frequencies, the relation between luminance and frequencies of multi-valued levels of a plurality of pixels is obtained as the luminance frequencies, and in said step of calculating first binarization threshold values in units of pixels, the second binarization threshold values in units of pixels is calculated by interpolating the first binarization threshold values-obtained in a plurality of blocks.

4. The method according to claim 3, wherein a region in which the second binarization threshold values are not interpolated repetitively uses the first binarization threshold value in units of blocks.

5. The method according to claim 3, wherein a pixel interval for interpolation of the second binarization threshold values is set.

6. The method according to claim 5, wherein the interpolation is performed at the set interval, and the calculated threshold value is repetitively used as threshold values of non-interpolated pixels.

7. An image processing apparatus, which obtains binarization threshold values for converting a multi-valued image into a binary image, comprising:

first arithmetic operation means for calculating luminance frequencies in units of blocks in a multi-valued image;

second arithmetic operation means for calculating binarization threshold values in units of blocks on the basis of the luminance frequencies, wherein the second arithmetic operation means comprises specifying means for specifying an optimal luminance frequency region in the luminance frequencies, calculating an average luminance value in the optimal luminance frequency region, and calculating the binarization threshold values in units of blocks on the basis of the average luminance value, and wherein the specifying means comprises discrimination means for discriminating a feature of an image on the basis of a skew of the luminance frequencies, and specifying the optimal luminance frequency region on the basis of the feature of the image; and interpolation means for calculating binarization threshold values in units of pixels by interpolating the binarization threshold values in units of blocks, wherein, said first arithmetic operation means obtains the relation between luminance and frequencies of multi-valued levels of a plurality of pixels as the luminance frequencies, and said interpolation means calculates the binarization threshold values in units of pixels by interpolating the binarization threshold values obtained in a plurality of blocks.

8. The apparatus according to claim 7, further comprising:

input means for inputting the multi-valued image; and binarization means for binarizing the multi-valued image using the binarization threshold values in units of pixels.

9. An image processing apparatus, which obtains binarization threshold values for converting a multi-valued image into a binary image, comprising:

first arithmetic operation means for calculating luminance frequencies in units of blocks in a multi-valued image;

second arithmetic operation means for calculating binarization threshold values in units of blocks on the basis of the luminance frequencies, wherein said second arithmetic means comprises specifying means for specifying an optimal luminance frequency region in the luminance frequencies, calculating an average luminance value in the optimal luminance frequency region, and calculating the binarization threshold values in units of blocks on the basis of the average luminance valued, and wherein said specifying means comprises discrimination means for discriminating a feature of an image on the basis of a skew of the luminance frequencies, and specifying the optimal luminance frequency region on the basis of the feature of the image;

first setting means for setting a region for interpolating the binarization threshold values in units of blocks; and interpolation means for calculating binarization threshold values in units of pixels by interpolating the binarization threshold values in units of blocks with respect to the set region, wherein, said first arithmetic operation means obtains the relation between luminance and frequencies of multi-valued levels of a plurality of pixels as luminance frequencies, and said interpolation means calculates the binarization threshold values in units of pixels by interpolating the binarization threshold values obtained in a plurality of blocks.

10. The apparatus according to claim 9, wherein a region other than the region set by said first setting means repetitively uses the binarization threshold value in units of blocks.

11. The apparatus according to claim 9, further comprising:

second setting means for setting a pixel interval for interpolation of the binarization threshold values.

12. The apparatus according to claim 11, wherein the interpolation is performed at the interval set by said second setting means, and the calculated threshold value is repetitively used as threshold values of non-interpolated pixels.

13. A computer program product, which comprises a computer useable medium having computer readable program code of obtaining binarization threshold values for converting a multi-valued image into a binary image, comprising:

computer readable first program code of calculating luminance frequencies in units of blocks in a multi-valued image;

computer readable second program code of discriminating a feature of an image on the basis of a skew of the luminance frequencies calculated by said first program code;

computer readable third program code of specifying an optimal luminance frequency region on the basis of the feature of the image discriminated by said second program code;

computer readable fourth program code of calculating an average luminance value in the optimal luminance frequency region specified by said third program code, and calculating binarization threshold values in units of blocks on the basis of the average luminance value; and computer readable fifth program code of calculating binarization threshold value in units of pixels by interpolating the binarization threshold values in units of blocks calculated by said fourth program code, wherein, by said first program code of calculating luminance frequencies, the relation between luminance and frequencies of multi-valued levels of a plurality of pixels is obtained as luminance frequencies, and by said fifth program code of calculating binarization threshold values in units of pixels, the binarization threshold values in units of pixels is calculated by interpolating the binarization threshold values obtained in a plurality of blocks.

* * * * *

UNITED STATES PATENT AND TRADEMARK OFFICE
CERTIFICATE OF CORRECTION

PATENT NO. : 6,333,788 B1
DATED : December 25, 2001
INVENTOR(S) : Yamada et al.

It is certified that error appears in the above-identified patent and that said Letters Patent is hereby corrected as shown below:

Column 12,
Line 65, "at" should be deleted.

Column 14,
Lines 31 and 51, "pixels;" should read -- pixel; --; and
Lines 32 and 52, "pixels." should read -- pixel. --.

Column 16,
Line 36, "TH_TL TH11," should read -- TH_TL=TH11, --.

Column 17,
Line 29, "to" should be deleted.

Column 21,
Line 31, "a" should be deleted.

Signed and Sealed this

Twenty-fifth Day of June, 2002

Attest:

JAMES E. ROGAN
Attesting Officer      Director of the United States Patent and Trademark Office